United States Patent
Dutta

(10) Patent No.: US 12,360,898 B2
(45) Date of Patent: Jul. 15, 2025

(54) REDIRECTION IN A PROCESSOR CACHE

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/393,059

(22) Filed: Dec. 21, 2023

(65) Prior Publication Data

US 2025/0209001 A1    Jun. 26, 2025

(51) Int. Cl.
*G06F 12/0811* (2016.01)
*G06F 12/0868* (2016.01)

(52) U.S. Cl.
CPC ...... *G06F 12/0811* (2013.01); *G06F 12/0868* (2013.01); *G06F 2212/283* (2013.01)

(58) Field of Classification Search
CPC ............ G06F 12/0811; G06F 12/0868; G06F 2212/283; G06F 2212/608; G06F 12/0873
USPC ......................................... 711/122, 119, 120
See application file for complete search history.

(56) References Cited

U.S. PATENT DOCUMENTS

2007/0233964 A1  10/2007  Robinson
2011/0119451 A1*  5/2011  Fuller ................. G06F 12/0802
                                                    711/E12.001
2015/0052310 A1   2/2015  Kim et al.
2019/0391921 A1* 12/2019  Miller ................. G06F 12/0853
2020/0401530 A1* 12/2020  Abulila ................. G06F 12/124

FOREIGN PATENT DOCUMENTS

EP         3382558 B1     1/2020

OTHER PUBLICATIONS

Extended European Search Report, Application No. 24220038.4-1218, dated May 14, 2025, 9 pages.

* cited by examiner

*Primary Examiner* — Hashem Farrokh
(74) *Attorney, Agent, or Firm* — Tong, Rea, Bentley & Kim, LLC

(57) ABSTRACT

Various example embodiments of a processor cache are presented herein. The processor cache may be configured to support redirection of memory blocks between cache lines, including between cache lines in different sets of the processor cache, thereby improving the efficiency of the processor cache by increasing the utilization of the processor cache and reducing cache misses for the processor cache. The redirection of memory blocks between cache lines may include redirection of a memory block from being stored in a first cache line of a first set of the processor cache which is the default set for the memory block (e.g., when the first set does not have any empty cache lines) to a second cache line of a second set of the processor cache which is not the default set for the memory block (e.g., the second set may be any set having at least one empty cache line).

21 Claims, 23 Drawing Sheets

*FIG. 7*

| SET | WAY-1 | WAY-2 | WAY-3 | WAY-4 | WAY-5 | WAY-6 | WAY-7 | WAY-8 |
|---|---|---|---|---|---|---|---|---|
| 1 | EMPTY | T=10110 | EMPTY | EMPTY | EMPTY | EMPTY | T=01101 | EMPTY |
| ⋮ | | | | | | | | |
| 22 | T=11011 | EMPTY | EMPTY | T=00010 | T=00101 | T=11110 | T=10101 | T=00001 |
| ⋮ | | | | | | | | |
| 26 | T=11101 | T=00101 | T=10101 | T=01010 | T=11011 | T=10110 | T=11110 | T=00001 |
| ⋮ | | | | | | | | |

SET ASSOCIATIVE CACHE 700

| SET | WAY-1 | WAY-2 | WAY-3 | WAY-4 | WAY-5 | WAY-6 | WAY-7 | WAY-8 |
|---|---|---|---|---|---|---|---|---|
| 1 | | | | | | | | |
| ⋮ | | | | | | | | |
| 22 | T=11011<br>R = 0<br>E = 0 | Empty | T= 11101<br>R = 0<br>E = 0 | T=00010<br>R = 0<br>E = 0 | T=00101<br>R = 0<br>E = 0 | T=11110<br>R = 0<br>E = 0 | T=10101<br>R = 0<br>E = 0 | T=00001<br>R = 0<br>E = 0 |
| ⋮ | | | | | | | | |
| 26 | T=11101<br>R={10010,<br>4, 3}<br>E = 0 | T=00101<br>R = 0<br>E = 0 | T=10101<br>R={10101,<br>6, 5}<br>E = 0 | T=01010<br>R = 0<br>E = 0 | T=11011<br>R = 0<br>E = 0 | T=10110<br>R = 0<br>E = 0 | T=11110<br>R = 0<br>E = 0 | T=00001<br>R = 0<br>E = 0 |
| ⋮ | | | | | | | | |

SET ASSOCIATIVE CACHE 800

SBV: 0000000100000000000000000

| SET | WAY-1 | WAY-2 | WAY-3 | WAY-4 | WAY-5 | WAY-6 | WAY-7 | WAY-8 |
|---|---|---|---|---|---|---|---|---|
| 1 | | | | | | | | |
| ⋮ | | | | | | | | |
| 22 | T=11011<br>R = 0<br>E = 0 | T=11010<br>R={26,4}<br>E=1 | T=11101<br>R = 0<br>E = 0 | T=00010<br>R = 0<br>E = 0 | T=00101<br>R = 0<br>E = 0 | T=11110<br>R = 0<br>E = 0 | T=10101<br>R = 0<br>E = 0 | T=00001<br>R = 0<br>E = 0 |
| ⋮ | | | | | | | | |
| 26 | T=11101<br>R={10010,<br>4, 3}<br>E = 0 | T=00101<br>R = 0<br>E = 0 | T=10101<br>R={10101,<br>6, 5}<br>E = 0 | T=01010<br>R={11010,<br>22, 2}<br>E = 0 | T=11011<br>R = 0<br>E = 0 | T=10110<br>R = 0<br>E = 0 | T=11110<br>R = 0<br>E = 0 | T=00001<br>R = 0<br>E = 0 |
| ⋮ | | | | | | | | |

SET ASSOCIATIVE CACHE 900

| SBV |
|---|
| 00000001000100000000000000000000 |

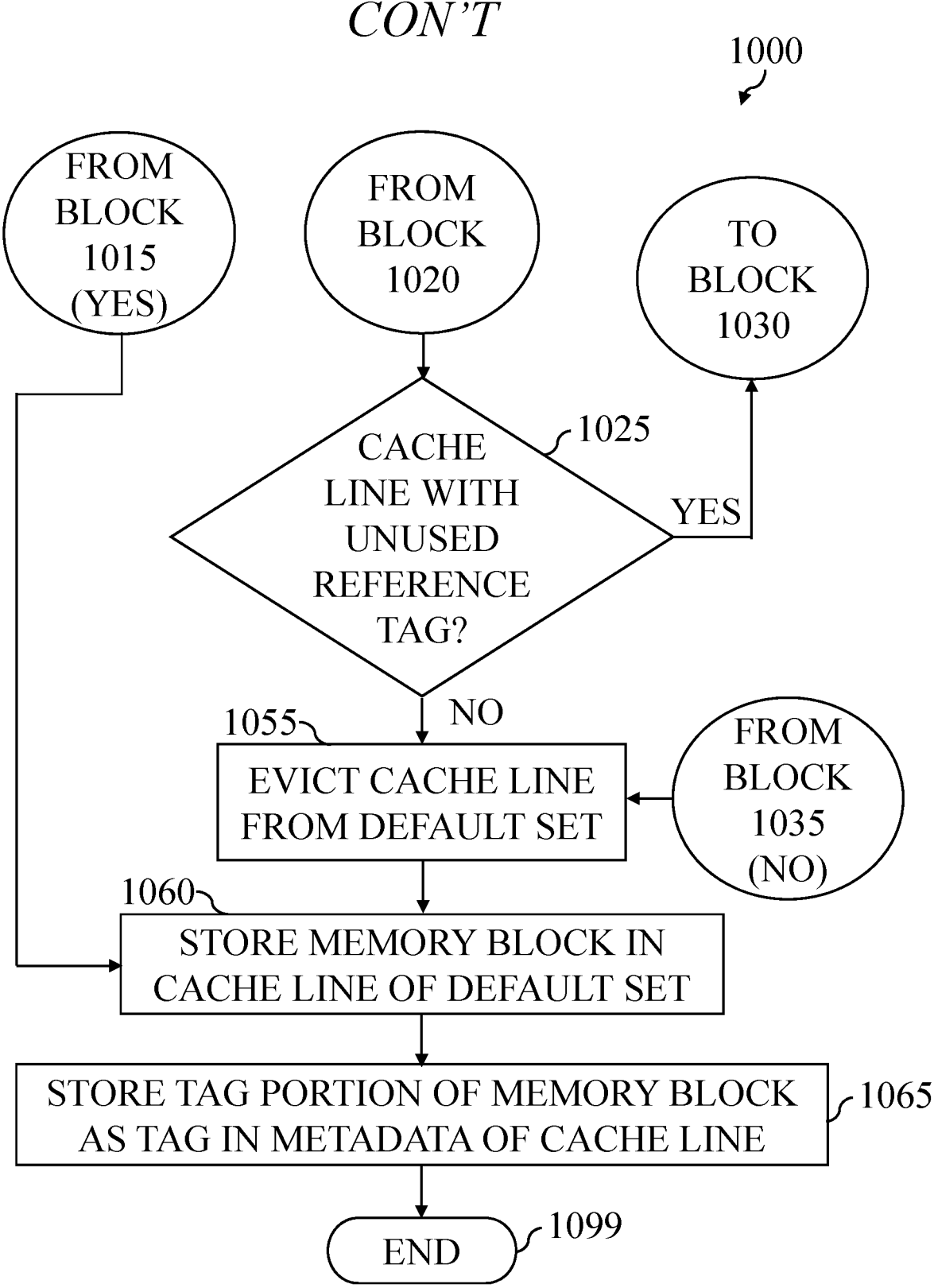
*FIG. 10 CON'T*

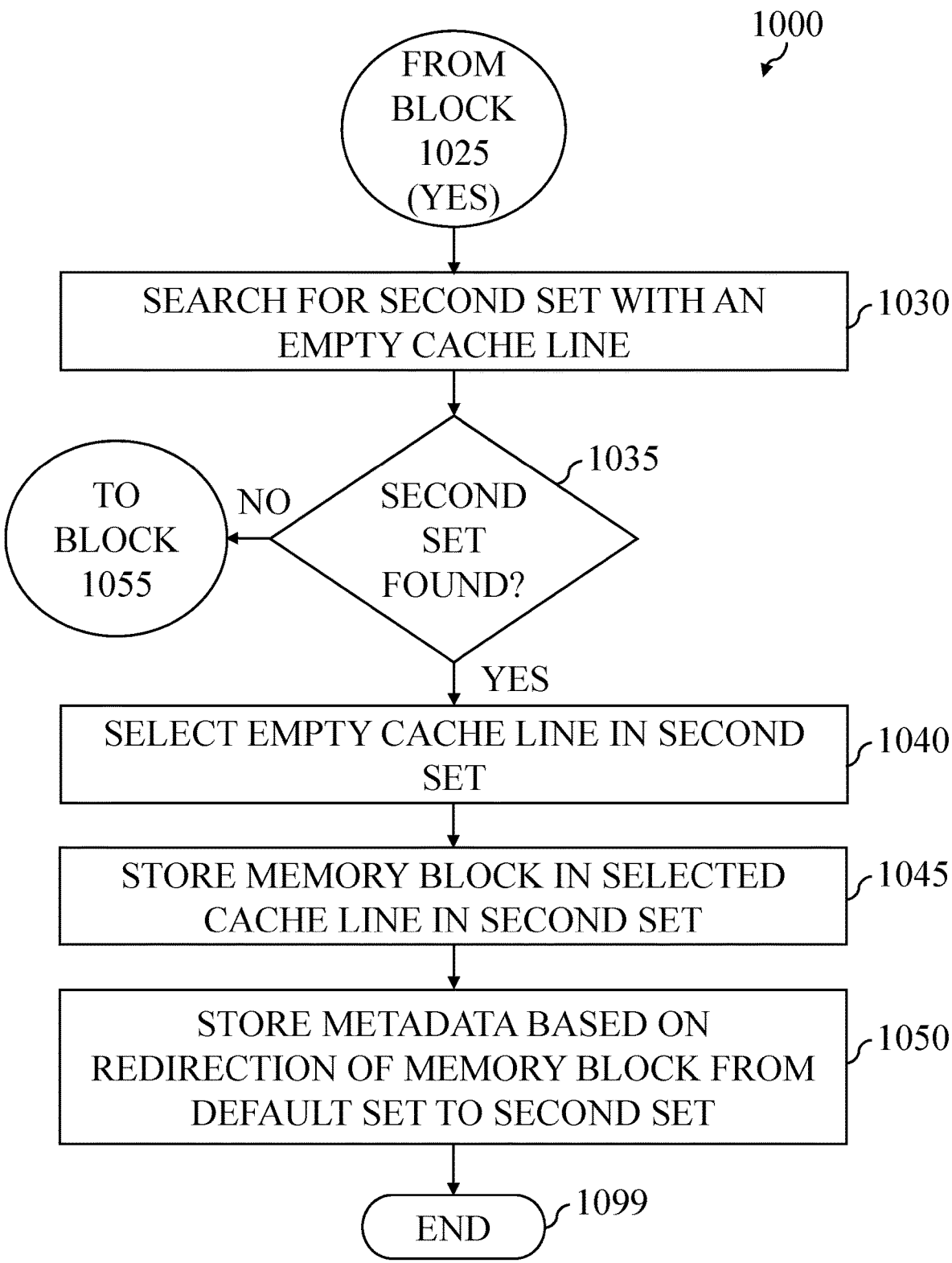
FIG. 10 CON'T

FIG. 12 CON'T
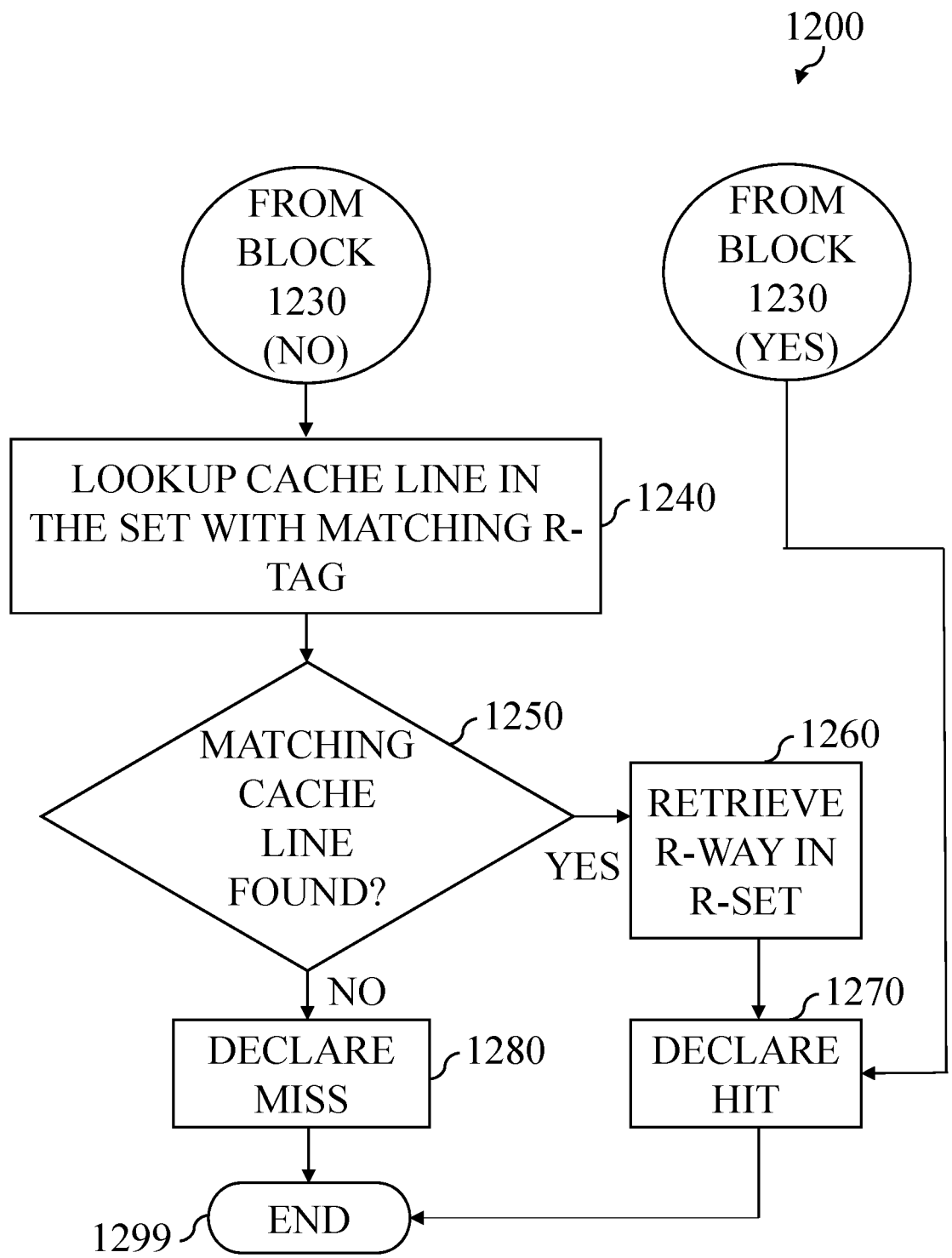

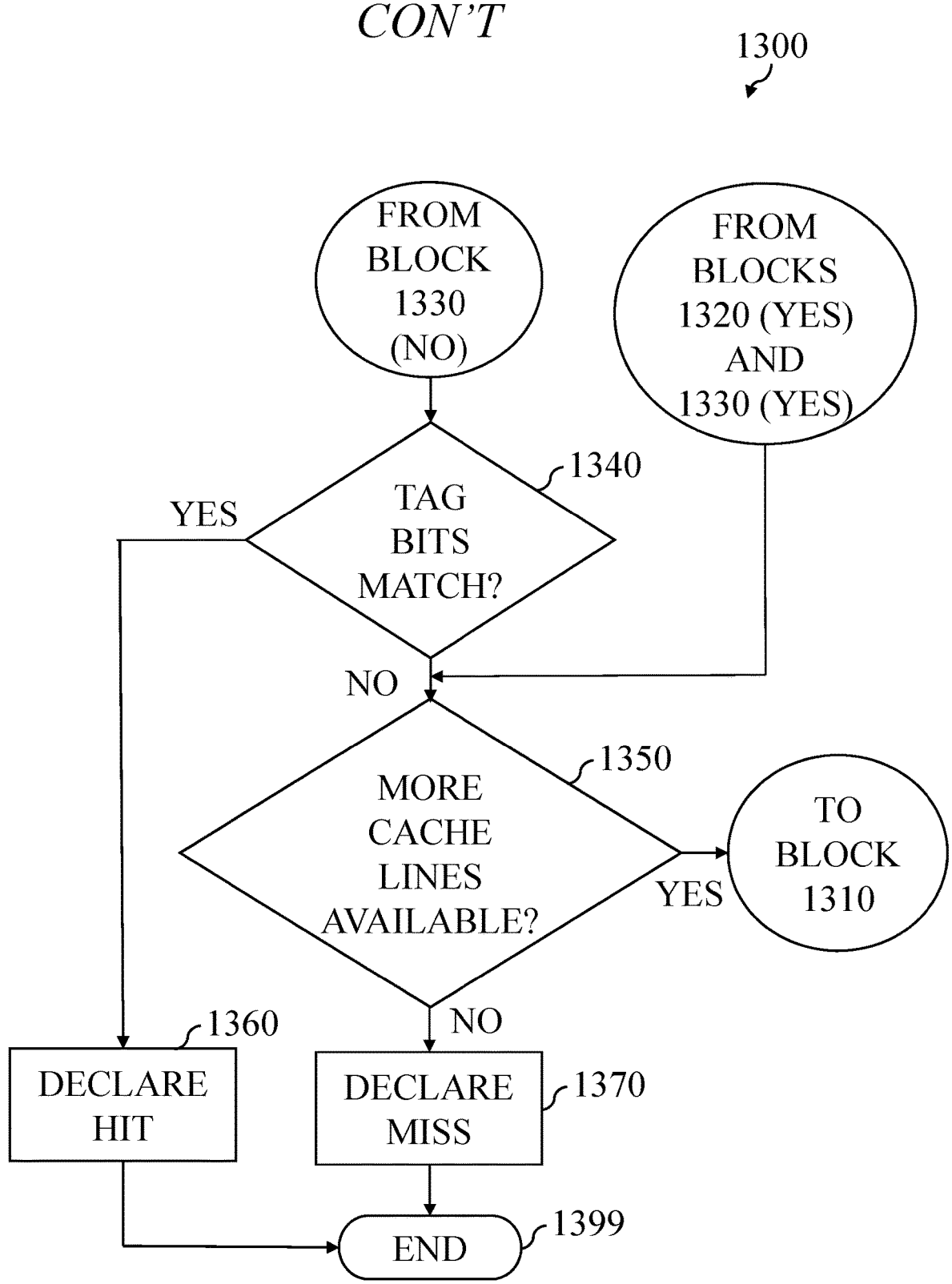
FIG. 13 CON'T

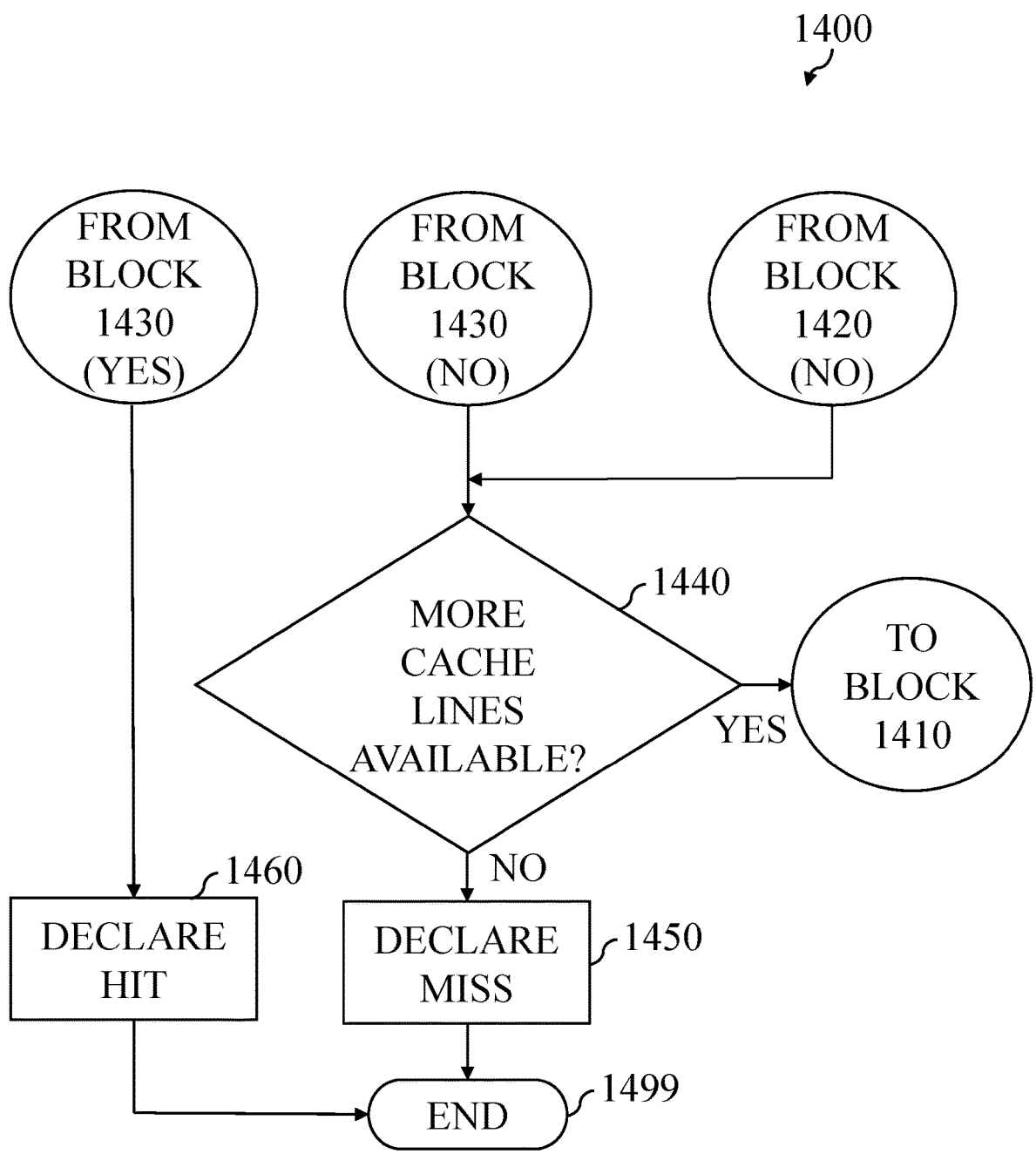
*FIG. 14 CON'T*

REDIRECTION IN A PROCESSOR CACHE

TECHNICAL FIELD

Various example embodiments relate generally to computer systems and, more particularly but not exclusively, to caches associated with processors of computer systems.

BACKGROUND

Computer systems utilize various types of processors to perform various functions in various contexts. Processors utilize various types of caches to perform various functions in various contexts.

SUMMARY

In at least some example embodiments, an apparatus includes a cache configured to store a first memory block in a first cache line of a first set of the cache and a second memory block in a second cache line of a second set of the cache, maintain, for the first cache line, first metadata including an indication of the first memory block stored in the first cache line and an indication that the second memory block was redirected to the second cache line, and maintain, for the second cache line, second metadata including an indication of the second memory block stored in the second cache line and an indication that the second memory block was redirected to the second cache line from the first cache line. In at least some example embodiments, the first memory block and the second memory block each map to the first set by default based on respective addresses of the first memory block and the second memory block. In at least some example embodiments, the cache is configured to store the first memory block in the first cache line of the first set based on a determination that the first memory block maps to the first set by default and a determination that the first cache line of the first set is empty. In at least some example embodiments, the cache is configured to store the second memory block in the second cache line of the second set based on a determination that the second memory block maps to the first set by default, a determination that the first set is full, a determination that the first cache line of the first set has not yet been used for a memory block redirection operation, and a determination that the second cache line of the second set is empty. In at least some example embodiments, the first metadata includes a first tag including the indication of the first memory block stored in the first cache line, and a second tag including the indication that the second memory block was redirected to the second cache line from the first cache line. In at least some example embodiments, the indication that the second memory block was redirected to the second cache line from the first cache line includes an identifier of the second memory block and an indication of an identity of the second cache line of the second set. In at least some example embodiments, the second tag includes a first field including the identifier of the second memory block, a second field including an identifier of the second set, and a third field including an identifier of the second cache line of the second set. In at least some example embodiments, the first metadata includes a third tag including an indication that the first memory block maps to the first set by default. In at least some example embodiments, the second metadata includes a first tag including the indication of the second memory block stored in the second cache line of the second set, and a second tag including the indication that the second memory block was redirected to the second cache line from the first cache line. In at least some example embodiments, the indication that the second memory block was redirected to the second cache line from the first cache line includes an indication of an identity of the first cache line of the first set. In at least some example embodiments, the second tag includes a first field including an identifier of the first set, and a second field including an identifier of the first cache line. In at least some example embodiments, the second metadata includes a third tag including an indication that the second memory block was stored in the second cache line based redirection of the second memory block. In at least some example embodiments, the cache is configured to determine, prior to redirection of the second memory block to the second cache line of the second set from the first cache line of the first set, that the first metadata does not currently include an indication that the first cache line of the first set has already been used for a memory block redirection operation, and select, based on the determination that the first metadata does not currently include an indication that the first cache line of the first set has already been used for a memory block redirection operation, the first cache line of the first set as a basis for redirection of the secondary memory block to the second cache line from the first cache line. In at least some example embodiments, the cache is configured to detect a request to retrieve the first memory block from the cache, determine, based on an address of the first memory block, that the first memory block maps to the first set by default, determine, based on the first metadata, that the first memory block is stored in the first cache line of the first set, and read the first memory block from the first cache line of the first set. In at least some example embodiments, the first metadata includes a primary tag including an identifier of the first memory block, and the determination that the first memory block is stored in the first cache line of the first set is based on matching of a portion of an address of the first memory block to the identifier of the first memory block. In at least some example embodiments, the cache is configured to detect a request to retrieve the second memory block from the cache, determine, based on an address of the second memory block, that the second memory block maps to the first set by default, determine, based on the first metadata, that the second memory block is stored in the second cache line of the second set, and read the second memory block from the second cache line of the second set. In at least some example embodiments, the first metadata includes a secondary tag including an identifier of the second memory block, an identifier of the second set, and an identifier of the second cache line of the second set, and the determination that the second memory block is stored in the second cache line of the second set is based on matching of a portion of an address of the second memory block to the identifier of the second memory block. In at least some example embodiments, the cache is configured to be disposed within a processor. In at least some example embodiments, the apparatus is a processor or a device including a processor.

In at least some example embodiments, a non-transitory computer readable medium stores computer program instructions which, when executed by an apparatus, cause the apparatus to store a first memory block in a first cache line of a first set of a cache and a second memory block in a second cache line of a second set of the cache, maintain, for the first cache line, first metadata including an indication of the first memory block stored in the first cache line and an indication that the second memory block was redirected to the second cache line, and maintain, for the second cache line, second metadata including an indication of the second memory block stored in the second cache line and an indication that the second memory block was redirected to the second cache line from the first cache line. In at least some example embodiments, the first memory block and the second memory block each map to the first set by default based on respective addresses of the first memory block and the second memory block. In at least some example embodiments, the first memory block is stored in the first cache line of the first set based on a determination that the first memory block maps to the first set by default and a determination that the first cache line of the first set is empty. In at least some example embodiments, the second memory block is stored in the second cache line of the second set based on a determination that the second memory block maps to the first set by default, a determination that the first set is full, a determination that the first cache line of the first set has not yet been used for a memory block redirection operation, and a determination that the second cache line of the second set is empty. In at least some example embodiments, the first metadata includes a first tag including the indication of the first memory block stored in the first cache line, and a second tag including the indication that the second memory block was redirected to the second cache line from the first cache line. In at least some example embodiments, the indication that the second memory block was redirected to the second cache line from the first cache line includes an identifier of the second memory block and an indication of an identity of the second cache line of the second set. In at least some example embodiments, the second tag includes a first field including the identifier of the second memory block, a second field including an identifier of the second set, and a third field including an identifier of the second cache line of the second set. In at least some example embodiments, the first metadata includes a third tag including an indication that the first memory block maps to the first set by default. In at least some example embodiments, the second metadata includes a first tag including the indication of the second memory block stored in the second cache line of the second set, and a second tag including the indication that the second memory block was redirected to the second cache line from the first cache line. In at least some example embodiments, the indication that the second memory block was redirected to the second cache line from the first cache line includes an indication of an identity of the first cache line of the first set. In at least some example embodiments, the second tag includes a first field including an identifier of the first set, and a second field including an identifier of the first cache line. In at least some example embodiments, the second metadata includes a third tag including an indication that the second memory block was stored in the second cache line based redirection of the second memory block. In at least some example embodiments, the computer program instructions, when executed by the apparatus, cause the apparatus to determine, prior to redirection of the second memory block to the second cache line of the second set from the first cache line of the first set, that the first metadata does not currently include an indication that the first cache line of the first set has already been used for a memory block redirection operation, and select, based on the determination that the first metadata does not currently include an indication that the first cache line of the first set has already been used for a memory block redirection operation, the first cache line of the first set as a basis for redirection of the secondary memory block to the second cache line from the first cache line. In at least some example embodiments, the computer program instructions, when executed by the apparatus, cause the apparatus to detect a request to retrieve the first memory block from the cache, determine, based on an address of the first memory block, that the first memory block maps to the first set by default, determine, based on the first metadata, that the first memory block is stored in the first cache line of the first set, and read the first memory block from the first cache line of the first set. In at least some example embodiments, the first metadata includes a primary tag including an identifier of the first memory block, and the determination that the first memory block is stored in the first cache line of the first set is based on matching of a portion of an address of the first memory block to the identifier of the first memory block. In at least some example embodiments, the computer program instructions, when executed by the apparatus, cause the apparatus to detect a request to retrieve the second memory block from the cache, determine, based on an address of the second memory block, that the second memory block maps to the first set by default, determine, based on the first metadata, that the second memory block is stored in the second cache line of the second set, and read the second memory block from the second cache line of the second set. In at least some example embodiments, the first metadata includes a secondary tag including an identifier of the second memory block, an identifier of the second set, and an identifier of the second cache line of the second set, and the determination that the second memory block is stored in the second cache line of the second set is based on matching of a portion of an address of the second memory block to the identifier of the second memory block. In at least some example embodiments, the cache is configured to be disposed within a processor. In at least some example embodiments, the apparatus is a processor or a device including a processor.

In at least some example embodiments, a method includes storing a first memory block in a first cache line of a first set of a cache and a second memory block in a second cache line of a second set of the cache, maintaining, for the first cache line, first metadata including an indication of the first memory block stored in the first cache line and an indication that the second memory block was redirected to the second cache line, and maintaining, for the second cache line, second metadata including an indication of the second memory block stored in the second cache line and an indication that the second memory block was redirected to the second cache line from the first cache line. In at least some example embodiments, the first memory block and the second memory block each map to the first set by default based on respective addresses of the first memory block and the second memory block. In at least some example embodiments, the first memory block is stored in the first cache line of the first set based on a determination that the first memory block maps to the first set by default and a determination that the first cache line of the first set is empty. In at least some example embodiments, the second memory block is stored in the second cache line of the second set based on a determination that the second memory block maps to the first set by default, a determination that the first set is full, a determination that the first cache line of the first set has not yet been used for a memory block redirection operation, and a determination that the second cache line of the second set is empty. In at least some example embodiments, the first metadata includes a first tag including the indication of the first memory block stored in the first cache line, and a second tag including the indication that the second memory block was redirected to the second cache line from the first cache line. In at least some example embodiments, the indication that the second memory block was redirected to the second cache line from the first cache line includes an identifier of the second memory block and an indication of an identity of the second cache line of the second set. In at least some example embodiments, the second tag includes a first field including the identifier of the second memory block, a second field including an identifier of the second set, and a third field including an identifier of the second cache line of the second set. In at least some example embodiments, the first metadata includes a third tag including an indication that the first memory block maps to the first set by default. In at least some example embodiments, the second metadata includes a first tag including the indication of the second memory block stored in the second cache line of the second set, and a second tag including the indication that the second memory block was redirected to the second cache line from the first cache line. In at least some example embodiments, the indication that the second memory block was redirected to the second cache line from the first cache line includes an indication of an identity of the first cache line of the first set. In at least some example embodiments, the second tag includes a first field including an identifier of the first set, and a second field including an identifier of the first cache line. In at least some example embodiments, the second metadata includes a third tag including an indication that the second memory block was stored in the second cache line based redirection of the second memory block. In at least some example embodiments, the method includes determining, prior to redirection of the second memory block to the second cache line of the second set from the first cache line of the first set, that the first metadata does not currently include an indication that the first cache line of the first set has already been used for a memory block redirection operation, and selecting, based on the determination that the first metadata does not currently include an indication that the first cache line of the first set has already been used for a memory block redirection operation, the first cache line of the first set as a basis for redirection of the secondary memory block to the second cache line from the first cache line. In at least some example embodiments, the method includes detecting a request to retrieve the first memory block from the cache, determining, based on an address of the first memory block, that the first memory block maps to the first set by default, determining, based on the first metadata, that the first memory block is stored in the first cache line of the first set, and reading the first memory block from the first cache line of the first set. In at least some example embodiments, the first metadata includes a primary tag including an identifier of the first memory block, and the determination that the first memory block is stored in the first cache line of the first set is based on matching of a portion of an address of the first memory block to the identifier of the first memory block. In at least some example embodiments, the method includes detecting a request to retrieve the second memory block from the cache, determining, based on an address of the second memory block, that the second memory block maps to the first set by default, determining, based on the first metadata, that the second memory block is stored in the second cache line of the second set, and reading the second memory block from the second cache line of the second set. In at least some example embodiments, the first metadata includes a secondary tag including an identifier of the second memory block, an identifier of the second set, and an identifier of the second cache line of the second set, and the determination that the second memory block is stored in the second cache line of the second set is based on matching of a portion of an address of the second memory block to the identifier of the second memory block. In at least some example embodiments, the cache is configured to be disposed within a processor. In at least some example embodiments, the apparatus is a processor or a device including a processor.

In at least some example embodiments, an apparatus includes means for storing a first memory block in a first cache line of a first set of a cache and a second memory block in a second cache line of a second set of the cache, means for maintaining, for the first cache line, first metadata including an indication of the first memory block stored in the first cache line and an indication that the second memory block was redirected to the second cache line, and means for maintaining, for the second cache line, second metadata including an indication of the second memory block stored in the second cache line and an indication that the second memory block was redirected to the second cache line from the first cache line. In at least some example embodiments, the first memory block and the second memory block each map to the first set by default based on respective addresses of the first memory block and the second memory block. In at least some example embodiments, the first memory block is stored in the first cache line of the first set based on a determination that the first memory block maps to the first set by default and a determination that the first cache line of the first set is empty. In at least some example embodiments, the second memory block is stored in the second cache line of the second set based on a determination that the second memory block maps to the first set by default, a determination that the first set is full, a determination that the first cache line of the first set has not yet been used for a memory block redirection operation, and a determination that the second cache line of the second set is empty. In at least some example embodiments, the first metadata includes a first tag including the indication of the first memory block stored in the first cache line, and a second tag including the indication that the second memory block was redirected to the second cache line from the first cache line. In at least some example embodiments, the indication that the second memory block was redirected to the second cache line from the first cache line includes an identifier of the second memory block and an indication of an identity of the second cache line of the second set. In at least some example embodiments, the second tag includes a first field including the identifier of the second memory block, a second field including an identifier of the second set, and a third field including an identifier of the second cache line of the second set. In at least some example embodiments, the first metadata includes a third tag including an indication that the first memory block maps to the first set by default. In at least some example embodiments, the second metadata includes a first tag including the indication of the second memory block stored in the second cache line of the second set, and a second tag including the indication that the second memory block was redirected to the second cache line from the first cache line. In at least some example embodiments, the indication that the second memory block was redirected to the second cache line from the first cache line includes an indication of an identity of the first cache line of the first set. In at least some example embodiments, the second tag includes a first field including an identifier of the first set, and a second field including an identifier of the first cache line. In at least some example embodiments, the second metadata includes a third tag including an indication that the second memory block was stored in the second cache line based redirection of the second memory block. In at least some example embodiments, the apparatus includes means for determining, prior to redirection of the second memory block to the second cache line of the second set from the first cache line of the first set, that the first metadata does not currently include an indication that the first cache line of the first set has already been used for a memory block redirection operation, and means for selecting, based on the determination that the first metadata does not currently include an indication that the first cache line of the first set has already been used for a memory block redirection operation, the first cache line of the first set as a basis for redirection of the secondary memory block to the second cache line from the first cache line. In at least some example embodiments, the apparatus includes means for detecting a request to retrieve the first memory block from the cache, means for determining, based on an address of the first memory block, that the first memory block maps to the first set by default, means for determining, based on the first metadata, that the first memory block is stored in the first cache line of the first set, and means for reading the first memory block from the first cache line of the first set. In at least some example embodiments, the first metadata includes a primary tag including an identifier of the first memory block, and the determination that the first memory block is stored in the first cache line of the first set is based on matching of a portion of an address of the first memory block to the identifier of the first memory block. In at least some example embodiments, the apparatus includes means for detecting a request to retrieve the second memory block from the cache, means for determining, based on an address of the second memory block, that the second memory block maps to the first set by default, means for determining, based on the first metadata, that the second memory block is stored in the second cache line of the second set, and means for reading the second memory block from the second cache line of the second set. In at least some example embodiments, the first metadata includes a secondary tag including an identifier of the second memory block, an identifier of the second set, and an identifier of the second cache line of the second set, and the determination that the second memory block is stored in the second cache line of the second set is based on matching of a portion of an address of the second memory block to the identifier of the second memory block. In at least some example embodiments, the cache is configured to be disposed within a processor. In at least some example embodiments, the apparatus is a processor or a device including a processor.

BRIEF DESCRIPTION OF THE DRAWINGS

The teachings herein can be readily understood by considering the following detailed description in conjunction with the accompanying drawings, in which:

FIG. 7 depicts an example embodiment of a set associative cache before storing a memory block where memory block redirection is not supported;

To facilitate understanding, identical reference numerals have been used herein, wherever possible, in order to designate identical elements that are common among the various figures.

DETAILED DESCRIPTION

Figure 1:
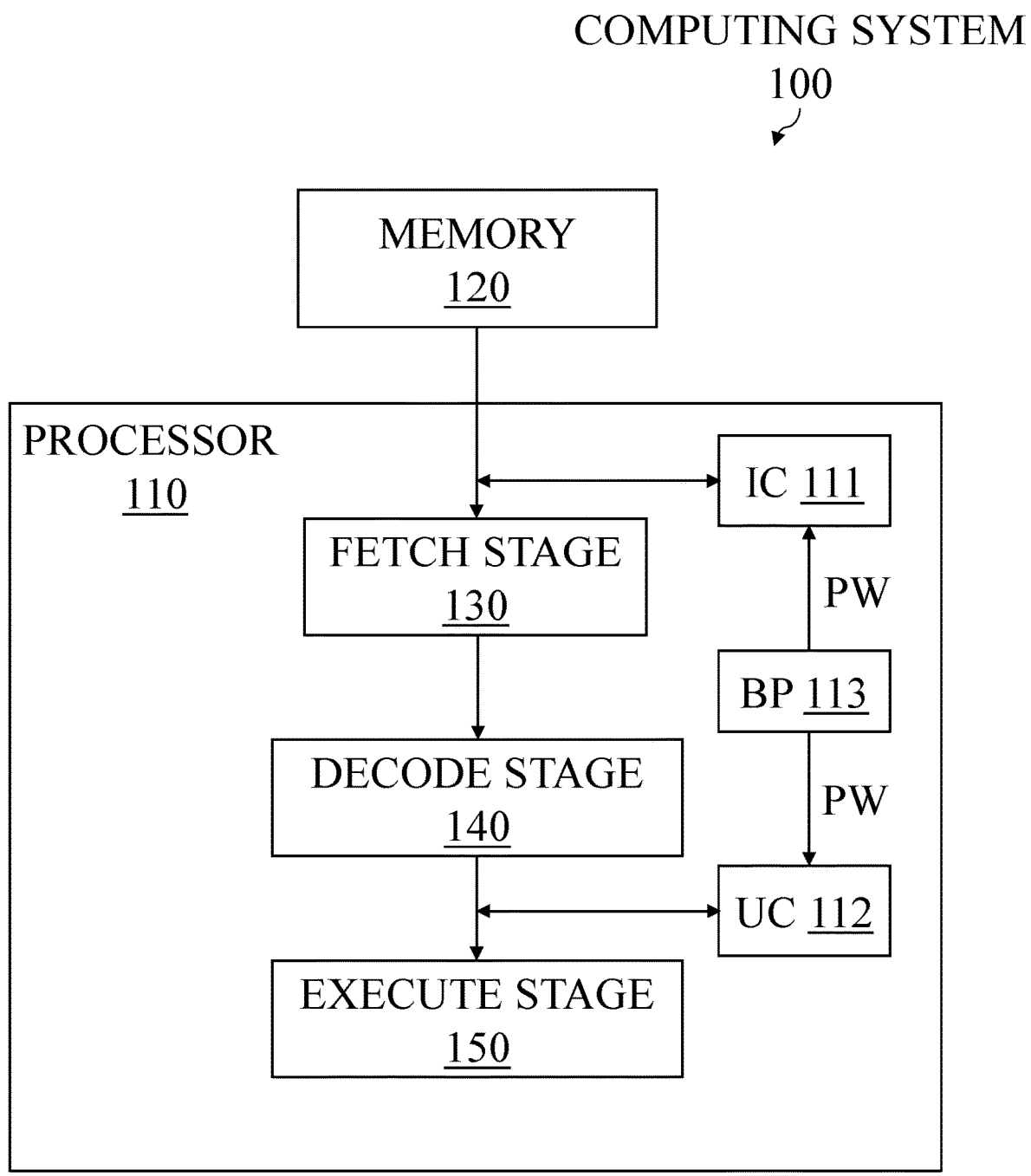
FIG. 1 depicts an example embodiment of a computing system including a processor and a memory for illustrating an instruction pipeline supported by the processor.

Various example embodiments of a processor cache are presented herein. The processor cache may be organized as a set associative cache, including a number of sets where each set is organized using a number of ways (e.g., an N-way set associative cache including sets where each of the sets is organized using N ways). The processor cache may be configured to support redirection of memory blocks between cache lines of the processor cache, including between cache lines in different sets of the processor cache, thereby improving the efficiency of the processor cache by increasing the utilization of the processor cache and reducing cache misses for the processor cache (e.g., allowing storage of memory blocks in portions of the processor cache which otherwise would not be able to be accessed for storage of memory blocks without use of such redirection of memory blocks between cache lines). The redirection of memory blocks between cache lines may include redirection of a memory block from being stored in a first cache line of a first set of the processor cache which is the default set for the memory block (e.g., when the first set does not have any empty cache lines to accommodate the memory block) to a second cache line of a second set of the processor cache which is not the default set for the memory block (e.g., where the second set may be any set having at least one empty cache line that is available to accommodate the memory block). The redirection of the memory block from the first cache line of the first set to the second cache line of the second set may include storage of metadata related to the redirection of the memory block from the first cache line of the first set to the second cache line of the second set. The metadata related to the redirection of the memory block from the first cache line of the first set to the second cache line of the second set is configured to enable later retrieval of the memory block from the second set even though the memory block would be expected to be retrieved from the first set because the first set is the default set for the memory block. The metadata related to the redirection of the memory block from the first cache line of the first set to the second cache line of the second set may include first metadata associated with the first cache line (e.g., an indication of the memory block that is actually stored in the first cache line, an indication of the memory block that has been redirected from the first cache line to the second cache line, an indication of the second cache line to which the memory block has been directed, or the like, as well as various combinations thereof) and second metadata associated with the second cache line (e.g., an indication of the memory block that is actually stored in the second cache line (which is the redirected memory block), an indication of the first cache line from which the memory block was redirected, or the like, as well as various combinations thereof). It will be appreciated that these and various other example embodiments of a processor cache configured to support redirection of memory blocks may be further understood by way of reference to the various figures, which are discussed further below.

FIG. 1 depicts an example embodiment of computing system including a processor and a memory for illustrating an instruction pipeline supported by the processor.

The computing system 100 includes a processor 110 and a memory 120. The processor 110 includes an instruction cache (IC) 111, a micro-operations cache (UC) 112, and a branch predictor (BP) 113. The high level stages in the pipeline supported by the processor 110 include a fetch stage 130, a decode stage 140, and an execute stage 150. The IC 111 and/or the UC 112 may be configured to support various example embodiments presented herein.

In the processor 110, the format and encoding of the instructions in a program to be executed by the processor 110 is determined by the Instruction Set Architecture (ISA) of the processor 110. For example, some well-known ISAs include x86/x86-64, IA-32/IA-64, MIPS, ARM, and so forth; however, the micro-architecture of a processor typically cannot execute the instructions of an ISA in their native form because of their complexity. An ISA is designed to offer sophisticated operations which, in turn, also keep the program compact, i.e., reduces the footprint of a program in the memory. It is noted that the optimal footprint of a program in memory is particularly important for optimal use of the IC. A majority of ISAs offer variable-length instructions, which further adds to the complexity of execution. So, at the micro-architectural level of a processor, instructions are represented by fixed-length simpler micro-operations (generally referred to as "micro-ops" or "UOPs"). An ISA instruction is broken down into one or more fixed-length UOPs. UOPs perform basic operations on data stored in one or more registers, including transferring data between registers or between registers and external buses, performing arithmetic and logical operations on registers, or the like. For example, for an add-register-to-memory ISA instruction that performs addition of the value in a register X to the value in a memory location M, the instruction is broken down into a sequence of three separate UOPs as follows: (1) load from M to a register Y, (2) add Y to X, and (3) store X to M.

In the processor 110, execution of a program is based on a pipeline which, as indicated above, includes the fetch stage 130, the decode stage 140, and the execute stage 150. The fetch stage 130 retrieves a block of instructions of a program from the IC 111 or the memory 120. The IC 111 is located on-board the processor 110. The IC 111 is generally much smaller in size (e.g., 32 KB, 64 kB, 128 KB, or the like) than the memory 120 and, thus, much faster than the memory 120. The IC 111 caches blocks of instructions fetched from the memory 120 in units called "IC lines" (or, more generally, cache lines). If a set of instructions is repeatedly fetched then those instructions are likely available in the IC 111, so a hit in the IC 111 reduces the time to fetch instructions (as compared with fetching the instructions from the memory 120). The IC 111 is agnostic of syntax and semantics of instructions and an IC line caches a memory block, i.e., all instructions in a fixed range of addresses in the memory 120. The typical size of an IC line is 64B, although it will be appreciated that other sizes can be supported. The processor 110 fetches a block of instructions from the memory 120 only if the IC line is not found in the IC 111. In the IC 111, a memory block is identified by the first memory address in the memory block. In the decode stage 140, instructions fetched during the fetch stage 130 are dynamically decoded by the processor 110 to the native UOPs of the instructions. This dynamic decoding also provides a cleaner separation of the "stable" and "standardized" ISA from the underlying micro-architecture of the processor 110 that is free to define its own UOP set. As a result, a program that has been written for an ISA can run on different micro-architectures supporting that ISA. This has enabled program compatibility between different generations of processors to be easily achieved. For example, different micro-architectures can support the same ISA, but each can define their own native UOP set. The execute stage 150 executes the UOPs supplied by the decode stage 140.

In the processor 110, the fetch stage 130 and the decode stage 140 generally are costly in terms of clock cycles as well as power consumption. So, many modern processors implement another instruction cache, typically referred to as a micro-op cache (UC) or decoded stream buffer (DSB), which stores the already decoded UOPs. This is illustrated as the UC 112 of the processor 110. When the processor 110 needs to execute an instruction and its decoded UOPs already exists in the UC 112, then the UC 112 can directly supply the UOPs to the execute stage 150. The UC 112 is generally much smaller in size (e.g. 1.5 kB, 2 KB, 3 KB, or the like) than the IC 111 and the memory 120 and, thus, much faster than the IC 111 and the memory 120 (typically operating at the clock speed of the processor 110). A hit in UC 112 eliminates the fetch stage 130 and the decode stage 140, both of which are costly, thereby improving the performance and power budget of the processor 110. An instruction is fetched and decoded only if it is a miss in the UC 112, otherwise the fetch stage 130 and the decode stage 140 can be powered off. It is noted that, although omitted from FIG. 1 for purposes of clarity, some processors may use a component called a Trace Cache (TC) instead of a UC, where a TC is simpler than a UC since a TC is a single large block including all instructions or micro-operations of a control flow.

In the processor 110, the UC 112 stores the UOPs received from the decode stage 140 in smaller sized blocks, but in the sequential order of execution. This means that each branch, conditional or unconditional, makes the processor 110 start with a new UC line even if the current IC line is not yet filled. This simple rule allows high bandwidth fetching from the UC 112 since, once there is a hit in UC 112, then the entire UC line can be supplied to the execute stage 150 without worrying about a change of execution sequence in the middle of a UC line. Herein, unless indicated otherwise, an address of an instruction in memory is referred to as an Instruction Pointer (IP). A UC line is identified by the IP of the parent instruction of the first UOP in the UC line; other than that no correlation exists between the UOPs in a UC line and their corresponding parent instructions, and it is noted that such correlation is not required since the entire UC line is supplied to the execute stage 150. As a result, UOPs in a UC line typically cannot be looked up by the IPs of their parent instructions.

In the processor 110, the BP 113 is configured to predict the outcome of a conditional branch instruction while fetching instructions from the memory 120, the IC 111, or the UC 112. A program may include branch instructions that alter the sequence of instructions executed by the processor 110. Branch instructions generally are of two types: one-way unconditional branch instruction and two-way conditional branch instruction. An unconditional branch instruction always jumps to a different location in program memory where a branch of the program code is stored. A conditional branch instruction can either be (1) "not taken" and continue execution with the first branch of the code which follows immediately after the conditional branch instruction or (2) "taken" and jump to a different place in program memory where the second branch of the code is stored. The outcome of a conditional branch instruction depends on certain conditions, such as a predicate variable. It is not known for certain whether a conditional branch will be taken or not taken until the condition has been calculated and the conditional branch has passed the execute stage 150 in the instruction pipeline. That means the processor 110 would have to wait until the conditional branch instruction has passed the execute stage 150 before the next instruction can enter the fetch stage 130 in the pipeline, which basically stalls the pipeline. To solve this problem, the front-end of the processor 110 tries to guess whether the conditional branch is more likely to be taken or not taken. The branch that is guessed to be the most likely is then fetched and speculatively executed. The BP 113 is logic circuitry that enables the front-end of the processor 110 to predict the outcome of a conditional branch instruction. If later it is detected that the guess was wrong, then the speculatively executed or partially executed instructions are discarded and the pipeline starts over with the correct branch, incurring a delay called "branch misprediction penalty".

It will be appreciated that processors generally implement each of the three high-level stages of the instruction pipeline using component stages. As a result, a pipeline of a processor may be composed of a large number of stages (e.g., 20 or more stages). An example of a processor, for illustrating stages used to implement portions of the instruction pipeline, is presented with respect to FIG. 2.

Figure 2:
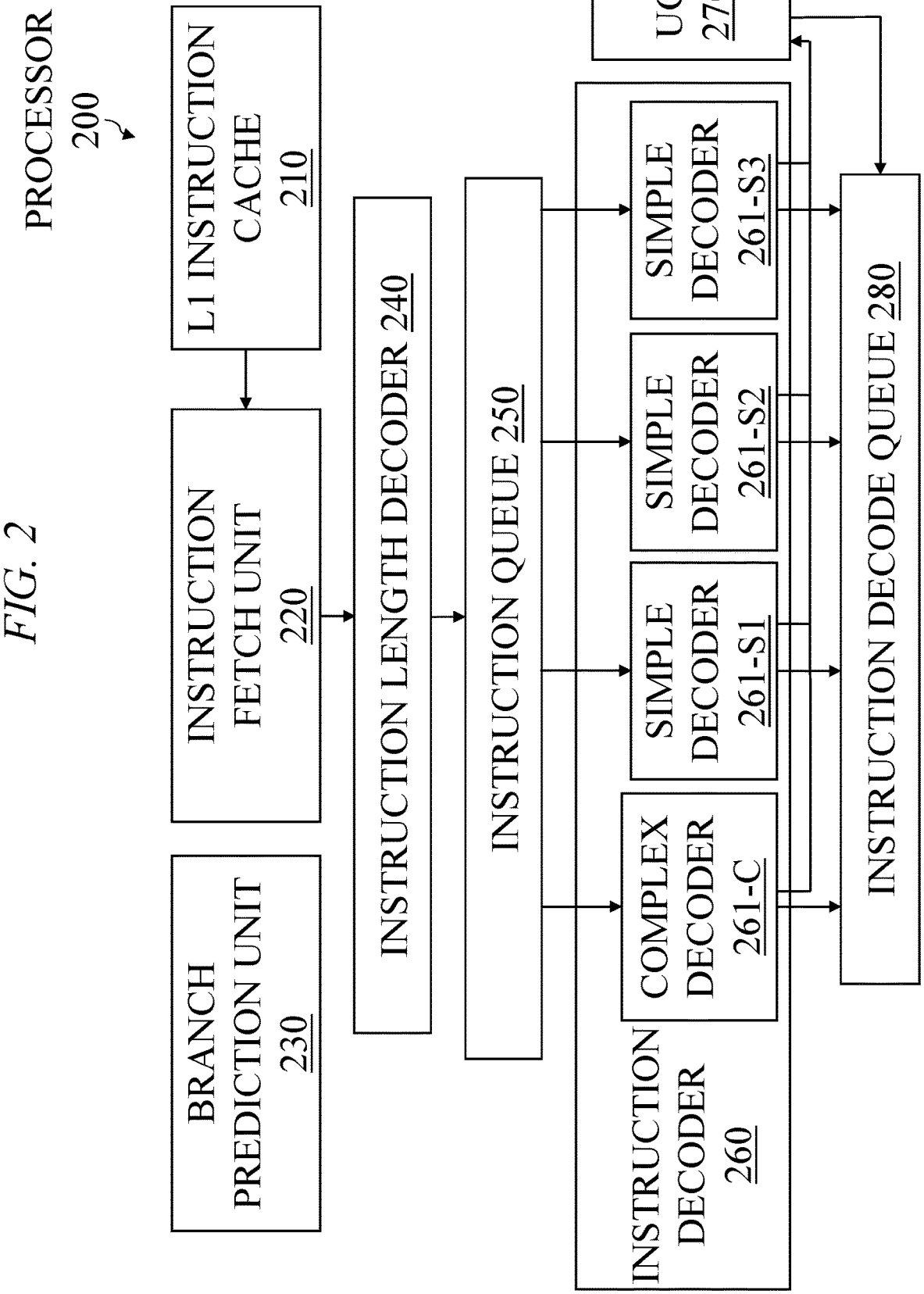
FIG. 2 depicts an example embodiment of a processor for use as a processor front-end for the processor of the computing system of FIG. 1.

FIG. 2 depicts an example embodiment of a processor for use as a processor front-end for the processor of the computing system of FIG. 1.

The processor 200 may include a frontend and a backend. It is noted that while details of the frontend are illustrated, details of the backend have been omitted for purposes of clarity.

The processor 200 includes a level 1 (L1) instruction cache (L1-IC) 210, an instruction fetch unit (IFU) 220, a branch prediction unit (BPU) 230, an instruction length decoder (ILD) 240, an instruction queue (IQ) 250, an instruction decoder (ID) 260, a UOP cache (UC) 270, and an instruction decode queue (IDQ) 280. It will be appreciated that the IFU 220 and BPU 230 may be considered to form the fetch stage while the ILD 240, IQ 250, ID 260, and IDQ 280 may be considered to form the decode stage.

The L1-IC 210 is a cache that is part of the cache hierarchy of the processor 200, and which may be further understood by considering the cache hierarchy of processors and the cache arrangement of caches in general.

In general, a cache is a smaller, faster memory, closer to a processor, which stores copies of the program instructions or program data from frequently accessed memory locations to reduce the average cost of access (time or energy). The program instructions or program data are stored in the cache by blocks of contiguous memory locations, typically referred to as cache lines, where each cache line is indexed in the cache by the first memory address in the cache line. Caches benefit from the temporal and spatial locality of memory access patterns in a program, where spatial locality refers to use of relatively close memory locations (e.g., within a cache line) and temporal locality refers to the reuse of specific caches line within a relatively small time duration. Many processors use multiple levels of caches. For example, a common processor architecture might utilize at least three levels (L) of caches, which are typically referred to as L1, L2, and L3. The L1 cache is the smallest and nearest to the processor cores and, thus, faster than the other cache levels. Typically, the L1 cache is split into two portions: the L1 Instruction Cache (e.g., 32 kB in size, 64 kB in size, or the like, although other sizes may be used) which holds only program instructions and the L1 Data Cache (e.g., 32 kB in size, 64 kB in size, or the like, although other sizes may be used) which holds only program data. The L2 cache (e.g., 256 kB in size, 512 KB in size, or the like, although other sizes may be used) and the L3 cache (e.g., 2 MB in size, 4 MB in size, or the like, although other sizes may be used) are the subsequent levels which are usually unified caches (meaning that they hold both program instructions and program data). The L3 cache typically is common for the processor cores in a multi-core processor and, thus, is located outside of the processor cores. It will be appreciated that the cache size and access latency grow according to the levels. If the cache line corresponding to a memory address sought is missing in the L1 cache, then the processor performs lookups in subsequent levels of caches (e.g., L2 cache, then L3 cache, and so forth). If the memory address is missing in all of the available cache levels, then the processor can access the main memory to retrieve the instruction or data at the memory address. So, main memory is accessed only if the memory address is missing in all caches. The missing block, once located, is brought into a cache line in the L1 cache.

In general, a cache is typically organized as set associative array, which can be imagined as M×N matrix. The cache is divided into M sets and each set contains N cache lines. To place a memory block into the cache, its address is typically divided into three fields: tag, index, offset. A memory block is first mapped into a set based on 'index bits' derived from the address of the memory block. Then the memory block is placed into a cache line in the set and a 'tag' is stored in the cache line. The tag is composed of the bits in the address of the memory block (other than the index bits) that can distinguish between the cache lines sharing the same set. The offset field refers to any address within a cache line. The offset field is composed of a few least significant bits of the address of the memory block and the number of bits is dependent on the size of the cache line. For example, if the cache line size is 64B, then the 6 least significant bits of the addresses of the memory blocks may be used as the offset bits. As previously indicated, the term "IP" is used to denote the memory address of an instruction, and the three fields of an IP that are used to map a block of instructions into a cache are referred to as IP-tag, IP-index, and IP-offset. In a typical cache, if all cache lines in a set are occupied while trying to store a new memory block, then an existing cache line in the set is evicted (a replacement policy picks which cache line to evict) to make way for the new memory block. When the evicted cache line is accessed later, then it will result in a miss in the cache and, thus, will need to be brought back into the cache from the memory hierarchy. Such misses are referred to as conflict misses and repeated conflict misses due to collisions between cache lines sharing the same set often is referred to as thrashing. If a cache line is evicted due to capacity overflow (i.e., no more unused cache lines across the cache) and the evicted cache line is accessed again then it will result in a miss in the cache. Such misses are called capacity misses. Capacity misses are extremely rare and, most often, the misses are due to thrashing.

The IFU 220 is responsible for feeding the processor with instructions to execute, and thus, it is the first component where instructions are processed. The IFU 220 mainly includes the required logic to compute the next fetch address and then fetch the instructions from the L1-IC 210. The instructions are fetched from the L1-IC 210 by the IFU 220 in streams of raw bytes.

The BPU 230 is configured to predict the next fetch address for the IFU 220 because, otherwise, branch instructions introduce a significant extra level of complexity in fetching streams of instructions, since the correct fetch address cannot be calculated until the branch instruction itself is executed. By default, instructions are processed by a processor sequentially. This sequential execution can be disrupted by the control instructions (e.g., conditional branches, unconditional branches, subroutine calls and subroutine returns, and so forth) to start executing an instruction sequence starting at a new address (the target address). For example, JE (Jump If Equal) is an example of a conditional branch instruction in x86 which is dependent on equality of two variables (data elements). A conditional branch is data-dependent (e.g., value of data acts as the condition) and branches to the target address only if the condition is true. An unconditional branch instruction always branches to the target address. For example, instructions such as CALL, RET, and JUMP are examples of unconditional branches for a subroutine call, a subroutine return, and an unconditional branch, respectively, in x86. Any control instruction other than a conditional branch instruction will switch the execution sequence to the target address specified in the instruction. Herein, the target instruction sequence of a control instruction is referred to generally as a control block. Execution of a program can be viewed as executing a chain of certain control blocks. Herein, an order of execution of control blocks in a program is referred to as a control flow (i.e., flow of control). Conditional branches (e.g., JE) can generate multiple control flows in a program since every such branch is a fork and the execution can go either way on the fork based on the condition of the fork. Control instructions introduce significant extra complexity in fetching streams of instructions, since the correct fetch address after the control instruction cannot be calculated until the backend executes the control instruction itself. For this reason, the frontend of high-performance processors (specifically, the BPU 230) predicts the next fetch address and speculatively starts fetching from the predicted address. There are two parts in this prediction. The first is predicting the direction of the branch taken by the control instruction, i.e., taken to the target sequence or not taken. The second part is predicting the target address of a branch. Once the direction of a branch is predicted, then the memory address of the control instruction and its predicted target address is stored in a Branch Target Buffer (BTB), which is a cache organized similar to the set associative array described in the context of L1-IC 210.

The ILD 240 provides a pre-decode phase. The ILD 240 separates the raw byte stream from the IFU 220 into a sequence of valid instructions and passes them to the IQ 250. For example, as indicated above, the length of an x86 instruction may vary between 1B to 15B and may reside in any byte address in program memory, thus requiring segregation of the raw byte stream into instructions of variable lengths. Decoding the length of several instructions per cycle adds a level of complexity, since the starting addresses have to be speculatively determined. That is, the fact that the starting address of the second instruction is not known until the length of the first instruction is computed, imposes serialization of the length decoding process, and parallelizing this requires determining the length of each instruction before decoding the instruction. The ILD 240 provides complex logic, based on many parallel and speculative computations, to help achieve such parallelization (although this comes at the price of increased power consumption).

The IQ 250 queues the instructions for the instruction decode phase. The IQ 250 queues the instructions, after the ILD 240 separates the instructions from the stream of raw bytes, for use by ID 260 in the instruction decode phase.

The ID 260 provides the instruction decode phase (which also may be referred to as a dynamic translation phase). In this phase, instructions are read from the IQ 250 and translated into subsequent functionally-equivalent UOPs. This translation is performed by one of several decoders in a set of decoders 261 including a complex decoder 261-C and three simple decoders 261-S1-261-S3 (although it will be appreciated that fewer or more instruction decoders may be used). Herein, the ID 260, including the set of decoders 261, also may be referred to as a Micro Instruction Translation Engine (MITE). The resultant UOPs are passed by the ID 260 to the IDQ 280, through which the UOPs may then enter the backend of the processor 200. For example, in an x86-based processor, simple instructions can translate into one to four UOPs and complex instructions can translate into five or more UOPs. It will be appreciated that, for processors based on other ISAs, instructions may be translated into other numbers of UOPs.

The UC 270, generally speaking, is a UOP cache that is configured to cache UOPs for instructions previously decoded by the MITE, thereby obviating a need for the MITE to re-decode instructions previously decoded by the MITE in order to obtain the associated UOPs (namely, avoiding the L1-IC→IFU→ILD→IQ→MITE decode path). This type of cache may be referred to as an L0 Instruction Cache (L0-IC), which may store blocks of instructions decoded into UOPs, in units of UC lines. UOP caches benefit from the temporal locality of control flows in a program, due to which previously executed instructions are executed again. Before fetching an instruction address from the L1-IC 210, it is first looked up in the L0-IC. If the corresponding UC line exists (meaning a "hit") in the L0-IC, then the associated UOPs are directly supplied to the IDQ 280 for further execution, thereby completely avoiding the L1-IC→IFU→ILD→IQ→MITE decoding path. If the corresponding UC line does not exist (meaning a "miss") in the L0-IC, then the instruction goes through entire complex decoding cycle through the L1-IC→IFU→ILD→IQ→MITE decoding path. The ability to avoid the L1-IC→IFU→ILD→IQ→MITE decoding path in this manner provide significant advantages, as the decoding process from instructions to UOPs (especially for high performance processors) can be costly in terms of circuitry, power consumption, and time, especially where a single complex instruction may perform several operations. It will be appreciated that, since the backend of a processor can execute several UOPs per clock cycle (e.g., six UOPs per cycle), the rate at which UOPs are supplied from the frontend of the processor 200 to the backend of the processor 200 is a key element of performance which may be achieved by high hit rate in the UC 270.

The IDQ 280 queues UOPs to be provided to the backend of the processor 200. The UOPs that are queued by the IDQ 280 may include UOPs decoded by the ID 260 (MITE) and UOPs delivered from the UC 270.

The backend of the processor 200, although the details are omitted for purposes of clarity, may include various elements such as a reorder buffer (e.g., configured to receive UOPs from the frontend of the processor 200), a unified reservation station having a set of ports configured to direct UOPs to various chains of elements), various elements or chains of elements configured to support execution of UOPs, or the like, as well as various combinations thereof.

Figure 3:
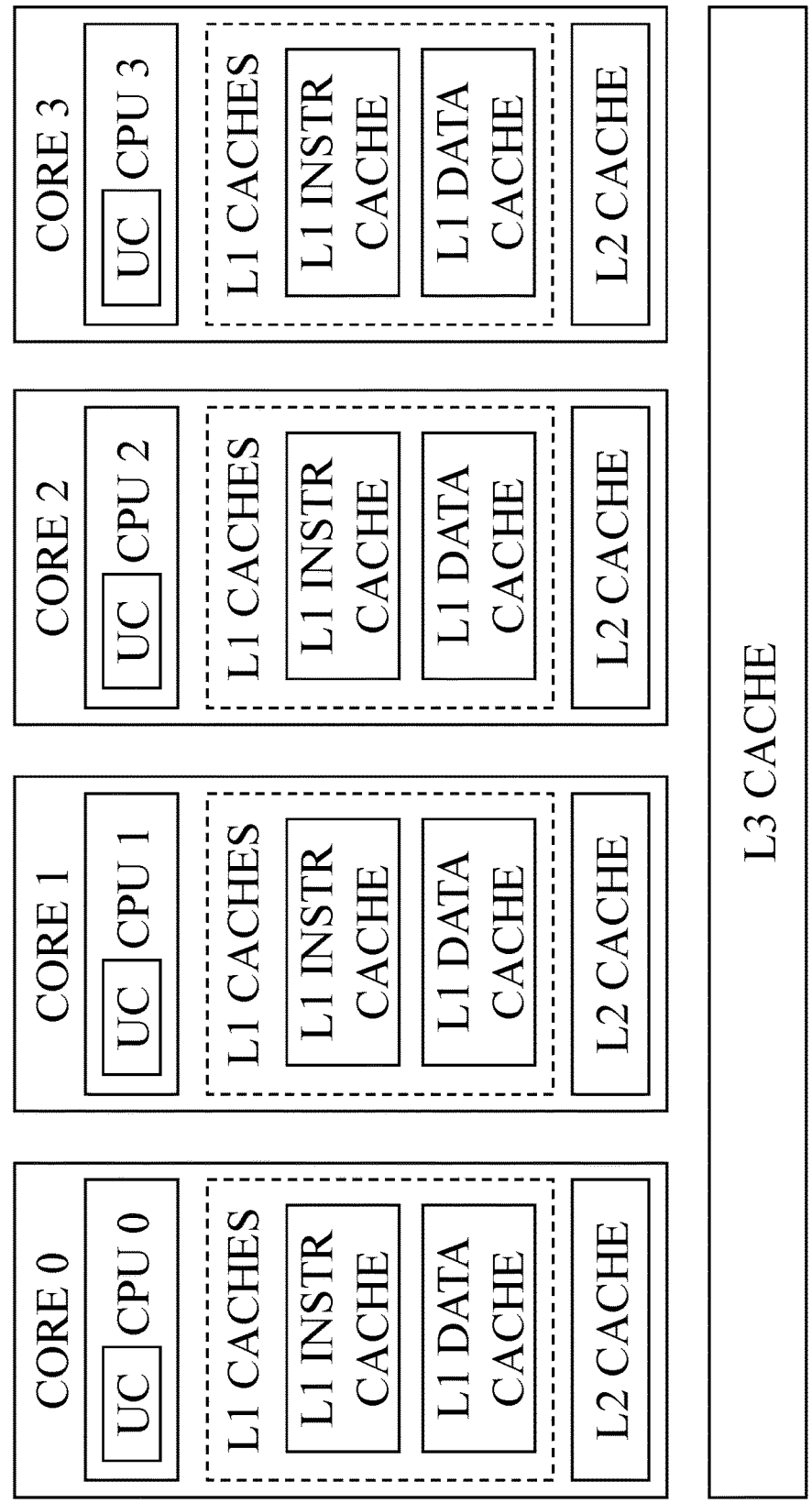
FIG. 3 depicts an example embodiment of a multi-core processor including multiple cores and multiple levels of caches.

FIG. 3 depicts an example embodiment of a multi-core processor including multiple cores and multiple levels of caches.

The multi-core processor 300 includes four cores (denoted as Core 0, Core 1, Core 2, and Core 3) and three levels of caches (denoted using L1, L2, and L3 indicators). In the multi-core processor 300, each of the cores includes a CPU (illustratively, including a micro-operations cache (UC)) and L1 and L2 caches (illustratively, including an L1 instruction cache, an L1 data cache, and an L2 cache), respectively. In the multi-core processor 300, the four cores share an L3 cache.

In general, a core is configured to operate as a processor (e.g., similar to the only core of a single core processor). It will be appreciated that each of the cores has its own pipeline (e.g., following the conceptual pipeline of FIG. 1, which may be implemented like the pipeline of FIG. 2 or using any other suitable pipeline implementation) that independently fetches, decodes, and executes instructions. Accordingly, herein, the term "processor" may be referring to the only core of a single core processor, a core of a multi-core processor, a combination of multiple cores of a multi-core processor, or the like.

In general, a cache is a smaller, faster memory, closer to a processor core, which stores copies of the program instructions or program data from frequently used memory locations to reduce the average cost (e.g., time and/or energy) of operating the processor core. The program instructions or program data are stored in the cache by blocks of contiguous memory locations, referred to as cache lines, where each cache line is indexed in the cache by the first memory address in the cache line. Caches benefit from the temporal and spatial locality of memory access patterns in a program. Spatial locality refers to use of relatively close memory locations (e.g., within a cache line). Temporal locality refers to the reuse of a specific cache line within a relatively small time duration.

In a multi-core processor, the levels of caches generally are arranged hierarchically as discussed below (although it will be appreciated that other arrangements are possible). L1 caches and L2 caches are specific to the processor cores, respectively, of the processor (i.e., each processor core has its own L1 cache(s) and L2 cache associated therewith), whereas the L3 cache of the processor is common for all of the processor cores in the processor. For each processor core, the L1 cache is the smallest cache and nearest to the processor core and, thus, faster than the rest of the cache levels. For each processor core, the L1 cache is split into two caches as follows: an L1 Instruction Cache (e.g., 32 KB in size, 64 KB in size, or any other suitable size) which holds program instructions and an L1 Data Cache (e.g., 32K in size, 64 KB in size, or any other suitable size) which holds program data. The L1 Instruction Cache may correspond to the IC in FIG. 1. L2 caches (e.g., 256 KB in size, 512 KB in size, or any other suitable size) and L3 caches (e.g., 2 MB in size, 4 MB in size, or any other suitable size) are the subsequent levels of caches, which are usually unified caches (meaning that the caches hold both program instructions and program data). For each processor core, the L2 cache is further from the processor core than the L1 cache. As indicated above, the L3 cache of the processor is common for all of the processor cores in the processor. Size and access latency grow according to the levels. If the cache line corresponding to a memory address sought is missing in the L1 cache, then processor performs lookups in subsequent levels of caches. Main memory is accessed only if the memory address is missing in all caches. Eventually, the missing block is read into a cache line in the L1 cache. UC is located inside a core. It will be appreciated that the operation of ICs and UCs in processors may be further understood by first considering example embodiments for the logical organization of a cache in a processor.

Figure 4:
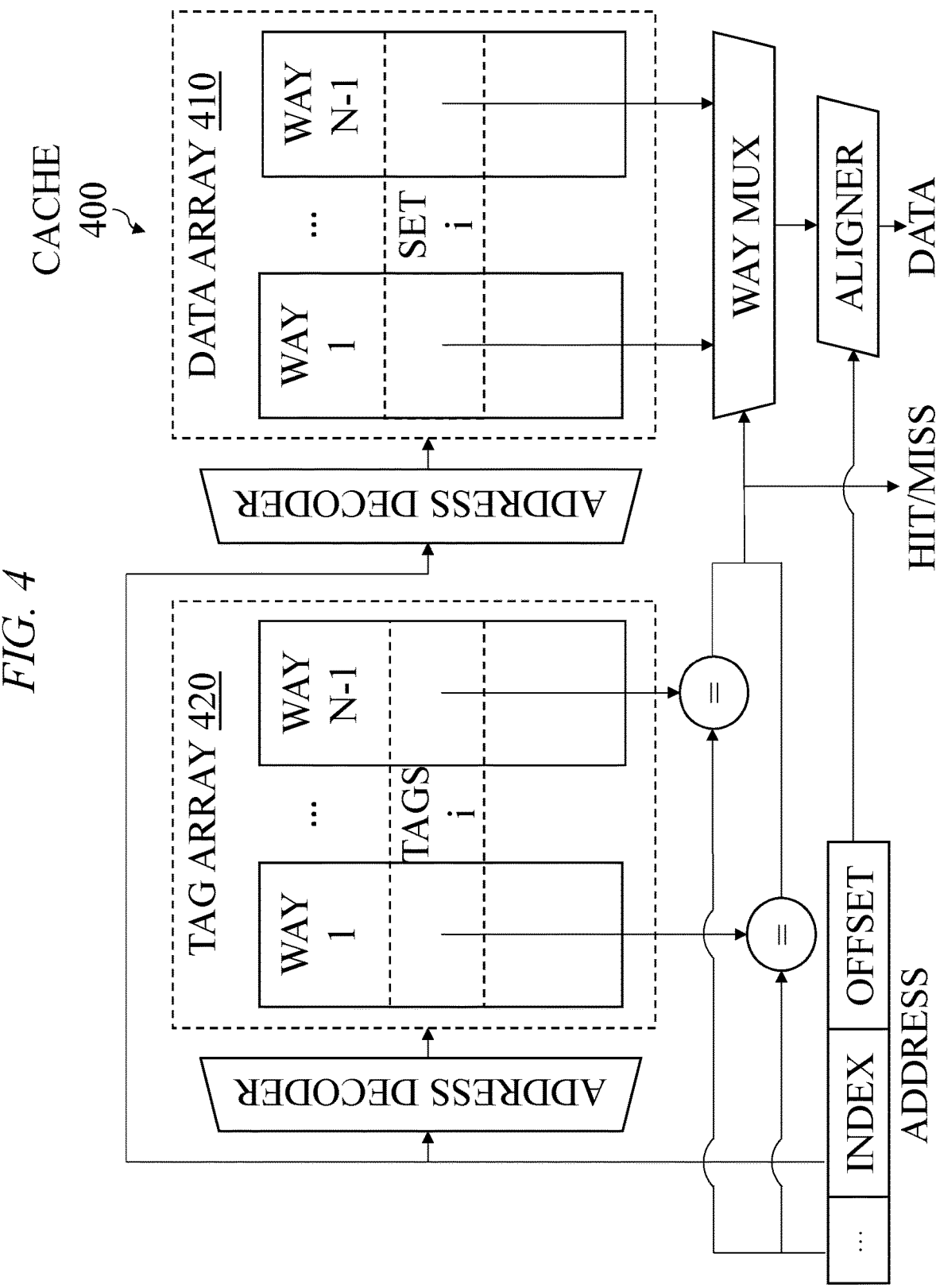
FIG. 4 depicts an example embodiment of an N-way set associative cache for use in a processor.

FIG. 4 depicts an example embodiment of an N-way set associative cache for use in a processor.

In FIG. 4, the N-way set associative cache 400 may be an instruction cache or data cache that stores memory blocks in cache lines. Herein, unless indicated otherwise, the address or an instruction or data in memory is referred to as a pointer, and the first address stored in a cache line is referred to as the pointer of the cache line or corresponding memory block.

As illustrated in FIG. 4, the N-way set associative cache 400 includes two main building blocks: a data array 410 and a tag array 420. The data array 410 stores the cache lines, while the tag array 420 is used in order to match pointers into data array entries. The data array 410 is logically organized as a group of S number of sets. Each set consists of N number of cache lines. The number of cache lines in a set is called the "degree of associativity" of the cache. It is noted that a cache of associativity N is an N-way associative cache, where each way is a cache line. A memory block is first mapped into a set Si by its pointer and then placed into any cache line Nj in the set Si. To map a memory block into the N-way set associative cache 400, the pointer is partitioned into three fields as illustrated in FIG. 5.

Figure 5:
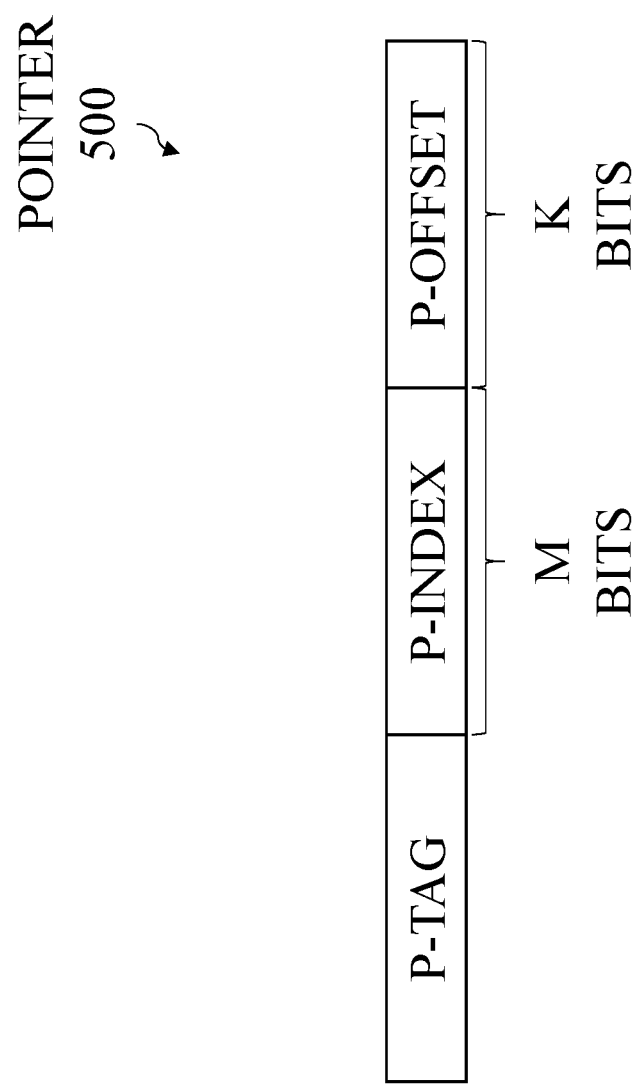
FIG. 5 depicts an example embodiment of a field partitioning an address of a memory block in memory.

FIG. 5 depicts an example embodiment of a field partitioning for an address of a memory block in memory.

As previously indicated, the term "pointer" may be used to refer to the address of a memory block in memory. As illustrated in FIG. 5, the pointer 500, in order to map a memory block into a cache, is partitioned into the following fields: P-tag, P-index, and P-offset. Here, the leading "P" is the shorthand for "pointer".

The P-offset field (which also may be referred to as the block offset or, more generally, the offset) includes the K least significant bits of the pointer 500, which are used to identify which bytes inside a cache line are to be accessed. Assuming the size of a cache line block is Q bytes, then $K=\log_2(Q)$ bits in the P-offset field. Herein, unless indicated otherwise, these K bits are denoted as P-offset.

The P-index field (which also may be referred to more generally as the index) includes the M next least significant bits of the pointer 500, which are used to identify the set Si in the cache. For a cache consisting of S sets, $M=\log_2(S)$ bits are needed in the P-index field. Herein, unless indicated otherwise, these M bits are denoted as P-index.

The P-tag field includes the remaining bits of the pointer 500. Herein, unless indicated otherwise, these bits are denoted as P-tag.

In a cache, different memory blocks can map to the same set Si in the cache (they have the same P-index due to overlapping M bits), so a mechanism is needed to reverse-map P-indexes to pointers. The tag array serves this purpose. The tag array has the same logical organization as the data array (same number of sets S and associativity N). For each cache line in the data array, the tag array often holds some metadata: the P-tag bits and the state of the cache line (valid, etc.).

In a cache, to lookup a pointer, a set Si in both the data array and the tag array is accessed using the P-index part; however, to know if a cache line within the set corresponds to the given pointer, the P-tag bits must match to an entry in the set Si in the tag array. If the P-tag bits of the j-th entry in the set Si match, then the correct data is in the j-th cache line of the corresponding data array in the set Si (this is called a "cache hit"). If no P-tags in the set Si match in the tag array, then the requested cache line does not reside in the cache (this is a "cache miss"). In the case of a cache miss, a request to the higher levels of the memory hierarchy may be issued and the processor will wait for the cache line to be installed in the cache before the access can proceed.

These points may be further understood by way of an example of an N-way set associative cache having particular numbers of sets and ways. For example, consider an 8-way associative cache with 64 sets with a cache line size of 64B. In this case, each cache line would hold a memory block of size 64B. Here K=6 and M=6. If the processor tries to access an instruction at IP 0xf045 (tag=0x1e, index=0x1, offset=0x5), then the processor looks for the cache line in set 1 bearing the tag 0x1e. If the cache line is found, then the fifth byte in the cache line is retrieved.

The access to the tag array and data array can occur serially or in parallel. In FIG. 4, a whole set is read from the data array while the tag array is accessed. The address is compared with the P-tag entries to determine in which cache line of the set reside the data that needs to be accessed. This information is fed to a multiplexer at the output of the data array (the way multiplexer) that chooses one of the cache lines (or ways) of the set. Finally, the offset part of the address is used to extract the appropriate bytes from the chosen cache line (this process is called data alignment).

The number of bits in the P-offset field determines the size of a cache line, i.e., the size of a cache line is $\log_2$(number of bits in P-offset field). The set in the cache is selected based on P-index and a cache line within the set (i.e., a way in the set) is tagged with the P-tag. In the example in FIG. 4, P-offset is 4-bits, P-index is 4 bits, and P-tag is 8-bits and, thus, for the exemplary cache line, P-tag=0xFF and P-index=0x0. Thus, the cache line is tagged with 0xFF in the set 0. As is evident, all instructions within a cache line share the same P-tag and P-index.

In general, the design of a cache with the paradigm of FIG. 4 enables simple and efficient implementation of the cache in hardware and, thus, this design has been the foundation of most caches found in processors. For example, when a memory block is to be stored in an N-way set associative cache, the memory block is first mapped to set Si based on the P-index bits of the pointer of the memory block. Then, the operations can be grouped into following steps: (1) each of the N entries (ways or cache lines) in Si of the tag array is looked up to see if an entry is empty (unused); if an empty entry is found then the memory block is stored in that entry, otherwise the method proceeds to step (2), (2) if all N entries of the set Si are in use then a second pass is made over the entries in set Si of the tag array to select an entry for eviction, (3) the selected entry is evicted, and (4) the memory block is stored into the selected entry (i.e., the entry in the tag array stores the P-tag of the memory block and the memory block is stored in the corresponding entry in the data array). It is noted that, if none of the N entries in set Si are empty, then step (1) above is a significant waste of clock cycles and power as this step requires each entry in Si of the tag array to be looked up only to eventually find that none of the entries are empty. Additionally, when cache lines are continually "thrashed" due to "conflict misses" then such waste of cycles and power multiply on every cache miss.

In general, a cache will suffer from conflict misses when Q number of frequently accessed memory blocks map to the same set Si, and the cache associativity N is less than Q. In that case, one of the valid cache lines in the set Si needs to be evicted to accommodate a newer memory block. When the evicted memory block is required by the processor again, then it will be a miss and will need to be fetched back to the cache. To make room for the memory block again, another cache line may need to be evicted and the pattern continues. This pattern is called thrashing of cache lines.

Various example embodiments of a processor cache may be configured to support improved storage of memory blocks in the processor cache using write operations on the processor cache and/or improved retrieval of memory blocks from the processor cache using read operations on the processor cache. Various example embodiments of a processor cache may be configured to support improved utilization of the processor cache while also reducing the likelihood of misses in the processor cache, reducing the latency of memory operations on the processor cache, reducing power consumption of the processor cache, or the like, as well as various combinations thereof. Various example embodiments of a processor cache may provide a processor cache that is configured to support redirection of memory blocks between cache lines, thereby improving efficiency of the processor cache by allowing storage of memory blocks in underutilized portions of the processor cache which otherwise would not be able to be accessed without use of such redirection of memory blocks between cache lines. It will be appreciated that these example embodiments of processor caches as well as various other example embodiments of processor caches may be further understood by considering the examples and example embodiments presented herein with respect to FIGS. 6-17.

Figure 6:
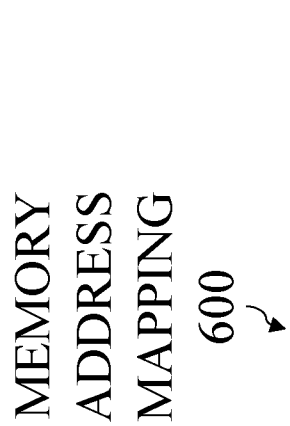
FIG. 6 depicts an example embodiment of P-tag, P-index, and P-offset mappings of an address of a memory block to be stored in a cache based on a write operation.

FIG. 6 depicts an example embodiment of P-tag, P-index, and P-offset mappings of an address of a memory block to be stored in a cache based on a write operation. In this example, assume that the 16-bit memory block with address 1011011010010101 needs to be stored in an 8-way set associative cache (N=8). Also, assume that the size of a cache line is 64B and that there are 32 sets in the 8-way set associative cache. It is noted that the bit positions start from zero to higher from right to left. Additionally, assume that the P-tag, P-index, and P-offset mappings of an address of a memory block are as shown in FIG. 6. As illustrated in the memory address mapping 600 of FIG. 6, Bits 0-5 (P-offset) are used for indexing an offset in a 64B cache line, Bits 6-10 (P-index) are used for indexing one of the 32 sets in the cache, and Bits 11-15 are used as P-tag. The set is determined by the P-index bits 11010, which maps to set 26. The storage of the memory block into the 8-way set associative cache is presented for the case in which memory block redirection is not used by the 8-way set associative cache (as presented with respect to FIG. 7) and for the case in which memory block redirection is used by the 8-way set associative cache (as presented with to FIG. 8 and FIG. 9).

FIG. 7 depicts an example embodiment of a set associative cache before storing a memory block where memory block redirection is not supported. In the set associative cache 700 of FIG. 7, only a few of the sets are shown (for purposes of clarity) and "T" means the Tag bits from the address of the memory block are used for the indexing mode. As illustrated in the memory address mapping 600 of FIG. 6, Bits 0-5 (P-offset) are used for indexing an offset in a 64B cache line, Bits 6-10 (P-index) are used for indexing one of the 32 sets in the cache, and Bits 11-15 are used as P-tag, so a determination is made that the P-index bits 11010 map to set 26 such that the set associative cache 700 will need to store the memory block in one of the ways of set 26. In the set associative cache 700, without support for memory block redirection, the set associative cache 700 will scan each of the eight ways of set 26 and determine that none of the eight ways are empty (each of the eight ways is full) and, thus, that the set associative cache 700 will have to evict one of the cache lines from one of the ways of set 26 in order to make room to store the memory block. When the evicted cache line is later required, it will be a miss in the cache since it was evicted.

It will be appreciated that there are various tradeoffs in the design of the processor cache. The higher the associativity of the cache, the less conflict misses the memory blocks will suffer. On the other hand, the more ways the cache has, the bigger the way multiplexor becomes, and this may affect the cycle time of the processor. Hit ratio in various caches is the heart of the performance of a processor. Additionally, conflict misses also lead to poorer capacity utilization of a cache. For example, empty ways in other sets remain unused while conflicting cache lines are evicted from a set. So, any scheme that improves hit ratio of a cache and utilization of a cache is a highly desirable. Various example embodiments are configured to improve the hit ratio and utilization of a cache based on redirection of memory blocks between sets of the cache.

Various example embodiment may be configured to support configuration of a processor cache as a "redirection vectored cache" (RVC) which enables a memory block that is being stored to a cache to be redirected from being stored in a cache line of the default set of the memory block in the cache to being stored in a cache line of a different set in the cache if the default set of the memory block in the cache is full (e.g., based on a determination that there is no empty cache line in the default set of the memory block in the cache). In this manner, an RVC is configured to reduce cache conflict misses and improve cache utilization, at the expense of a relatively small increase in the amount of metadata maintained per cache line. In an RVC, the metadata of each cache line may include two tags as follows: (1) a primary tag that is associated with the memory block that is currently stored in that cache line and (2) a redirection tag that identifies a second memory block that maps to the set of that cache line by default, but which is stored in a second cache line in a second set. The primary tag may include a single field that identifies the memory block stored in that cache line (e.g., the P-tag bits of the address of the memory block). The redirection tag may include the tuple {R-tag, R-set, R-way}, where R-tag is the tag of the second memory block, R-set is the identification of the second set, and R-way is the second cache line (way) in the second set where the second memory block is stored after being redirected from the first set to the second set. The redirection tag also may be referred to herein as a redirection tuple (or R-tuple). The second cache line may be marked as "external" (a bit assigned for it in the metadata of the second cache line) to indicate that the set (the second set) is not the default set of the memory block stored in the second cache line. The "external" bit may provide additional efficiencies in the cache (e.g., when a third memory block is looked up in the second set, where the second set is the default set for the third memory block, then all cache lines marked as "external" may be skipped). It is noted that the RVC also may support use of various types of occupancy state information which may be used to facilitate various aspects of redirection (e.g., the RVC may maintain a Set-Utilization Bit Vector (SBV) that is configured to track sets of the cache that have empty cache lines, where the bit positions correspond to the sets, respectively, and the bits of the bit positions are set in a manner for indicating whether or not the sets are full).

Figure 8:
FIG. 8 depicts an example embodiment of a set associative cache before storing a memory block where memory block redirection is supported.
Figure 9:
FIG. 9 depicts an example embodiment of a set associative cache after storing a memory block based on redirection where memory block redirection is supported.

It will be appreciated that these as well as various other aspects of various example embodiments of an RVC may be further understood by way of reference to the example described with respect to FIG. 7 (which provides an example for the case in which memory block redirection is not used by the 8-way set associative cache) and with respect to FIG. 8 and FIG. 9 (which provides an example for the case in which memory block redirection is used by the 8-way set associative cache).

In the example, as indicated above, assume that the cache is an 8-way set associative cache having 32 sets, where the size of each cache line is 64B. Assume that the 16-bit memory block with address 1011011010010101 needs to be stored in the cache (where it is noted that the bit positions start from zero to higher from right to left. Additionally, assume that the P-tag, P-index, and P-offset of an address follows the same format as presented in FIG. 6 (namely, partitioning of the address of the memory block results in P-tag=10110, P-index=11010, and P-offset=010101). The set is determined by the P-index bits 11010, which maps to set 26. In the metadata of each cache line, as discussed above, "T" corresponds to the primary tag and means the P-tag bits from the address of the memory block, "R" corresponds to the redirection tag, and "E" provides an indication as to whether or not the cache line is external (i.e., whether a memory block has been redirected from that cache line to a cache line in a different set). The state of the cache prior to storage of the memory block is illustrated in FIG. 8 and the state of the cache after storage of the memory block is illustrated in FIG. 9.

FIG. 8 depicts the state of the cache before storing the memory block. As illustrated in FIG. 8, the set associative cache 800 is configured to support redirection of memory blocks. The cache first attempts to store the memory block in set 26 which is the default set for the memory block. The cache determines whether any of the 8 ways in set 26 is empty such that it may accommodate storage of the memory block. For example, where the cache supports an SBV, the cache may check the SBV to determine whether set 26 has an empty cache line that can accommodate the memory block (although it will be appreciated that the cache may determine whether set 26 has an empty cache line in other ways including without using the SBV, such as by iterating through each of the cache lines to attempt to identify one that is empty). The cache determines that there is no empty cache line in default set 26. So, the cache then attempts to determine whether one of the cache lines in default set 26 is available for supporting a redirection of the memory block to a different set (e.g., a cache line that has an empty redirection tag (e.g., R=None) that can be used for redirection). As depicted in FIG. 8, way 1 and way 3 of default set 26 have used the redirection tag, but the rest of the ways of default set 26 have unused redirection tags available for supporting redirection of the memory block to a different set of the cache. Assume that the cache selects way 4 of set 26 to perform the redirection operation (it is noted that any other way of the default set 26 with unused redirection tags also could have been selected). The cache then identifies a set that has an available cache line to which the memory block can be directed from way 4 of default set 26. For example, where the cache supports an SBV, the cache may check the SBV to identify an alternate set with an empty cache line to which the memory block may be redirected (although it will be appreciated that the cache may identify an alternate available set in other ways including without using the SBV). In this example, assume that the cache has selected set 22 as the alternate set and, based on a determination that way 2 of alternate set 22 is empty, as decided to store the memory block in way 2 of set 22.

FIG. 9 depicts the state of the cache before storing the memory block. As illustrated in FIG. 9, the set associative cache 900 is configured to support redirection of memory blocks. The memory block is redirected from way 4 of set 26 to way 2 of set 22, where the memory block has been stored. The primary tag "T" in the metadata of way 2 of set 22 where the memory block is stored includes the P-tag of the memory block. The redirection tag in way 4 of set 26 is encoded with R-tag=11010, R-set=22 and R-way=2, providing a pointer from the cache line from which the memory block was redirected to the cache line to which the memory block was redirected. The redirection tag in way 2 of set 22 is encoded with R-sct=26 and R-way=4, providing a backpointer that points from the cache line to which the memory block was redirected and stored back to the cache line that redirected the memory block. It is noted that set 22 now no longer has an empty way, so bit 22 in the SBV is set accordingly (e.g., to "1"). Now, assume that at some point the memory block needs to be retrieved from the cache. The address of the memory block is looked up in the cache. The address of the memory block maps to set 26 by default, so set 26 is selected and the primary ("T") tags in the ways of set 26 are searched with the P-tag bits 11010 of the memory block. Here, none of the ways of set 26 are matched with the tag 11010 of the memory block, a second pass is made through the set 26 to search the redirection tags in the ways of set 26 to determine if the memory block was redirected to a different set of the cache. Here, the R-tag in way 4 matches the tag 11010 of the address of the memory block, and the pointer information within the tuple indicates that the memory block was redirected to way 2 of set 22 (namely, within the redirection tag of way 4 of set 26, the R-set is 22 and the R-way is 2), so the memory block is retrieved from way 2 in set 22.

It will be appreciated that the cache may be configured to support additional functions for supporting use of redirection within the cache. For example, if a cache line is evicted then the Empty status of the cache line is set to true, but if the cache line has a valid R-tag then the R-tag remains valid since the R-tag redirects to a cache line in a different set (i.e., eviction of a memory block from a cache line will not impact a previous redirection of a memory block from that cache line to a cache line in a different set). For example, when a first cache line with the E-bit set (means external to the set) is evicted, then the redirection tag in the second cache line that redirected the stored memory block to the first cache line needs to be invalidated, in which case the redirection tag of the first cache line is used to identify the second cache line and then invalidate the redirection tag in the second cache line (where, here, the second cache line is the one from which the evicted memory block was redirected). It will be appreciated that the cache may be configured to support various other additional functions for supporting use of redirection within the cache.

It will be appreciated that configuration of a cache to support use of redirection may enable various improvements in the operation of the cache (e.g., using various example embodiments of RVC may provide various advantages or potential advantages). For example, assume that, without use of redirection, lookup of an address in the cache requires two clock cycles (e.g., in the first clock cycle the tag bits of an address are matched against the tags of the ways in the default set in Tag Array and, If a way matches, then the corresponding cache line is retrieved from data array in the second clock cycle). By contrast, in various example embodiments of RVC, in the first clock cycle tag bits of an address are matched against the tags of the ways in the default set in Tag Array, if no matching way is found then in the second clock cycle tag bits of the address are matched against the R-tags of the ways in the default set in Tag Array, and, if a matching way is found then in the third clock cycle the cache line is retrieved from R-way in R-set of the Data Array. Additionally, in at least some example embodiments, the search for the P-tag of the memory block in the default set of the cache may be performed by searching the primary tags and redirection tags of the ways of the set in parallel, in which case the worst case lookup time would be two clock cycles rather than three clock cycles. In any event, while the cache without use of redirection would have been a miss if the default set was full (which would have resulted in a few additional clock cycles to fetch the memory block from the next level cache or memory), in various example embodiments of RVC the memory block could have been handled without a cache miss at the cost of only one additional clock cycle or even without any additional clock cycles while parallel lookups are used (while also improving the utilization of the cache as well). It will be appreciated that, since a cache line will be evicted only if there are neither empty cache lines in the default set nor a cache line with unused R-tag in the default set, various example embodiments may improve the cache utilization by a factor of two and reduce conflict misses by a factor of two.

Figure 10:
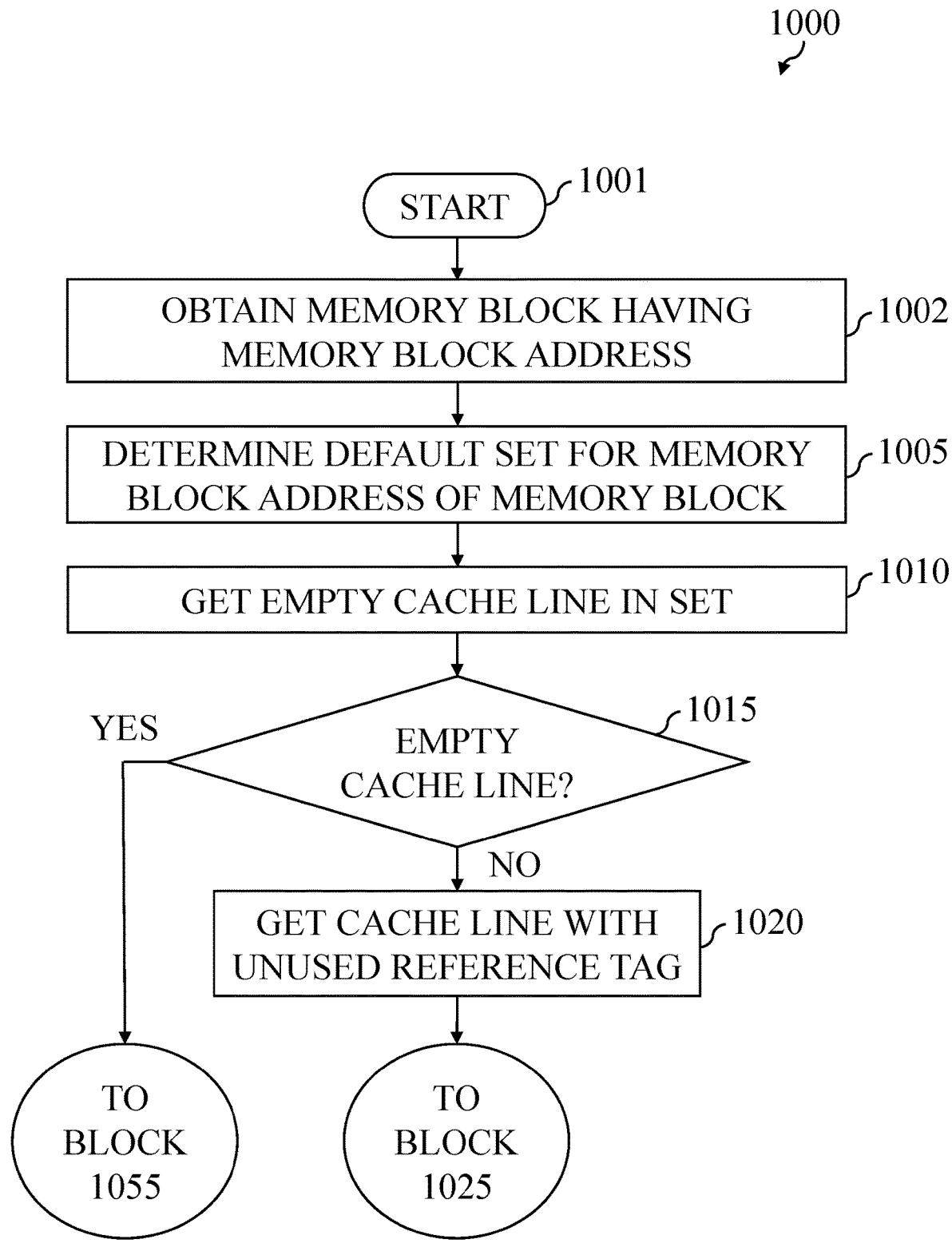
FIG. 10 depicts an example embodiment of method for storing a memory block into a set associative cache supporting memory block redirection.

FIG. 10 depicts an example embodiment of method for storing a memory block into a set associative cache supporting memory block redirection. It will be appreciated that, although primarily presented herein as being performed serially, at least a portion of the functions of method 1000 may be performed contemporaneously or in a different order than as presented in FIG. 10. At block 1001, the method 1000 begins. At block 1002, a memory block to be stored in the cache is obtained, where the memory block has a memory block address associated therewith. The memory block to be stored in the cache may be obtained as an input to the method 1000. At block 1005, a default set of the memory block is determined. The default set of the memory block may be determined based on the memory block address of the memory block (e.g., based on the index bits in the address of the memory block). At block 1010, an attempt is made to find an empty cache line in the default set for the memory block. In at least some example embodiments, the block 1010 may be performed using the method of FIG. 11. At block 1015, a determination is made as to whether an empty cache line was found in the set. If an empty cache line was found in the set then the method 1000 proceeds to block 1015. If an empty cache line was not found in the set, then the method 1000 proceeds to block 1060 (for storage of the memory block without having to evict a cache line from the set). At block 1020, an attempt is made to find a cache line in the set with an empty redirection tag. At block 1025, a determination is made as to a cache line with an empty redirection tag is found. If a cache line with an empty redirection tag is found, then the method 1000 proceeds to block 1030. If a cache line with an empty redirection tag is not found, then the method 1000 proceeds to block 1055 (for eviction of a cache line prior to storage of the memory block). At block 1030, which is reached when a cache line with an empty redirection tag is found in the set, a determination is made as to whether there is a second set that has at least one empty cache line. At block 1035, a determination is made as to whether a second set that has at least one empty cache line has been found. If a second set that has at least one empty cache line is found, then the method 1000 proceeds to block 1040. If a second set that has at least one empty cache line is not found, then the method 1000 proceeds to block 1055 (for eviction of a cache line prior to storage of the memory block). At block 1040, an empty cache line in the second set is selected. At block 1045, the memory block is stored in the empty cache line selected from the second set. At block 1050, metadata is stored based on redirection of the memory block from the default set to the second set and then the method 1000 proceeds to block 1099 where the method 1000 ends. The storage of the metadata may include storage of metadata for the first cache line of the default set that was used for redirection of the memory block, e.g., in the redirection tag, the R-tag includes the tag bits from the address of the memory block, R-set is the identity of the second set, and R-way is the way number of the second cache line in second set. The storage of the metadata may include storage of metadata for the second cache line of the second set in which the memory block was stored, e.g., in the redirection tag the R-set is the identity of the default set and R-way is the way number of the cache line in default set and the E-bit may be set to indicate that the cache line holds an external memory block (meaning that the second set is not the default set for the memory block). At block 1055, an empty cache line is evicted from the default set. At block 1060, the memory block is stored into the evicted cache line of the default set. At block 1065, the tag portion of the address of the memory block is stored as the tag of the cache line in the default set, and then the method 1000 proceeds to block 1099 where the method 1000 ends. At block 1099, the method 1000 ends.

Figure 11:
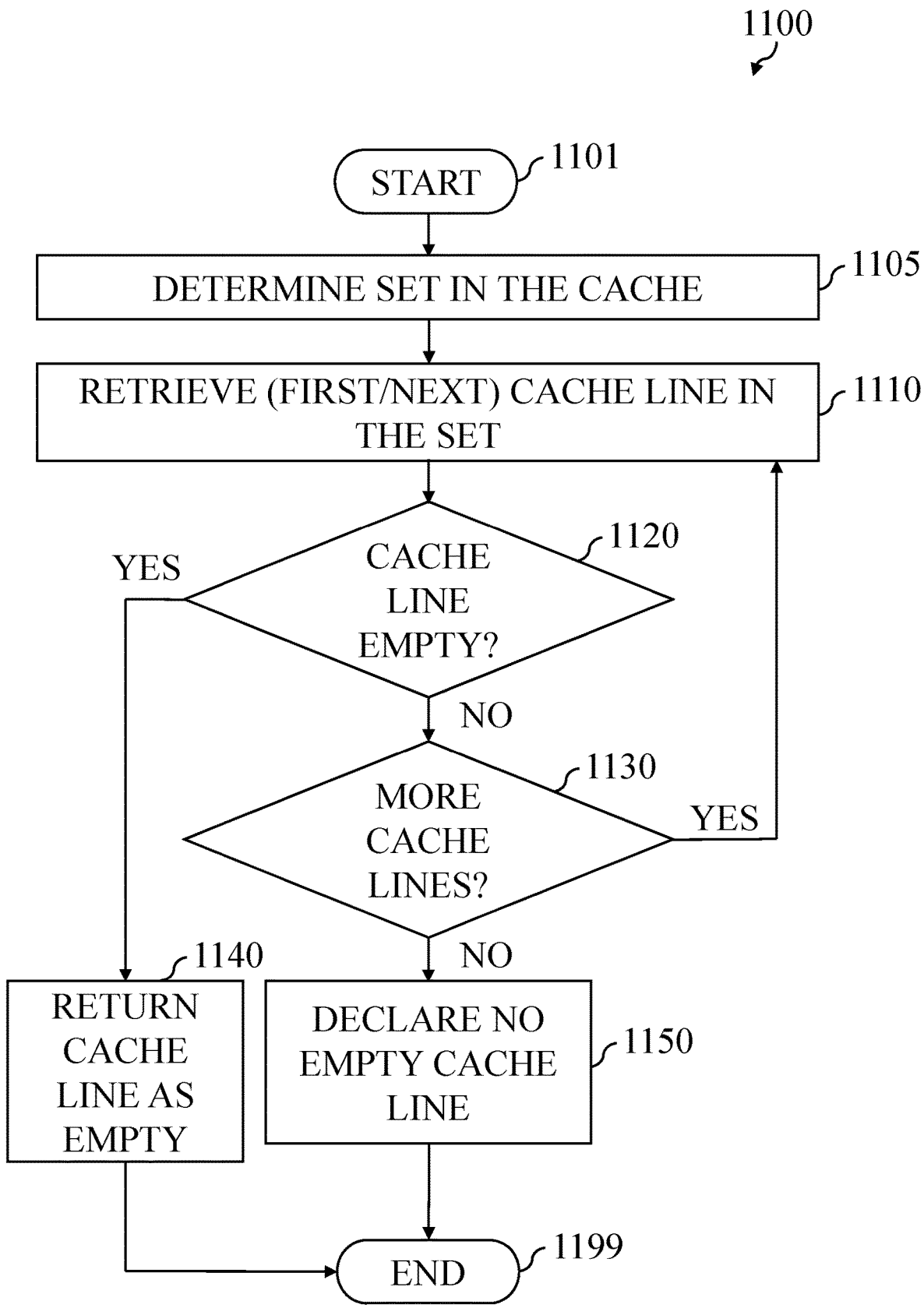
FIG. 11 depicts an example embodiment of a method for finding an empty cache line in a set of a set associative cache, for use in conjunction with the method of FIG. 11.

FIG. 11 depicts an example embodiment of a method for finding an empty cache line in a set of a set associative cache, for use in conjunction with the method of FIG. 10. It will be appreciated that the method 1100 of FIG. 11 may be used to implement the block 1010 of FIG. 10. It will be appreciated that, although primarily presented herein as being performed serially, at least a portion of the functions of method 1100 may be performed contemporaneously or in a different order than as presented in FIG. 11. At block 1101, the method 1100 begins. At block 1105, a set in the cache is determined. The set in the cache may be determined as an input to the method 1100. At block 1110, a cache line in the set is retrieved. In the first pass through, this is the first cache line in the set that is selected. In subsequent passes through, this is a next cache line in the set that has not been selected previously. At block 1120, a determination is made as to whether the cache line is empty. If the cache line is not empty, then the method 1100 proceeds to block 1130. If the cache line is empty, the method 1100 proceeds to block 1140. At block 1130, a determination is made as to whether more cache lines are available in the set to be checked. If there are more cache lines available in the set, then the method 1100 returns to block 1110 (at which point the next cache line in the set is selected). If there are no more cache lines available in the set, then the method 1100 proceeds to block 1150. At block 1140, the cache line of the set determined to be empty is returned as the selected cache line, and then the method 1100 proceeds to block 1199 where the method 1100 ends. At block 1150, after all of the cache lines of the set have been checked and none of them have been determined to be empty, the result that is returned is an indication that there is no empty cache line in the set, and then the method 1100 proceeds to block 1199 where the method 1100 ends. At block 1199, the method 1100 ends.

Figure 12:
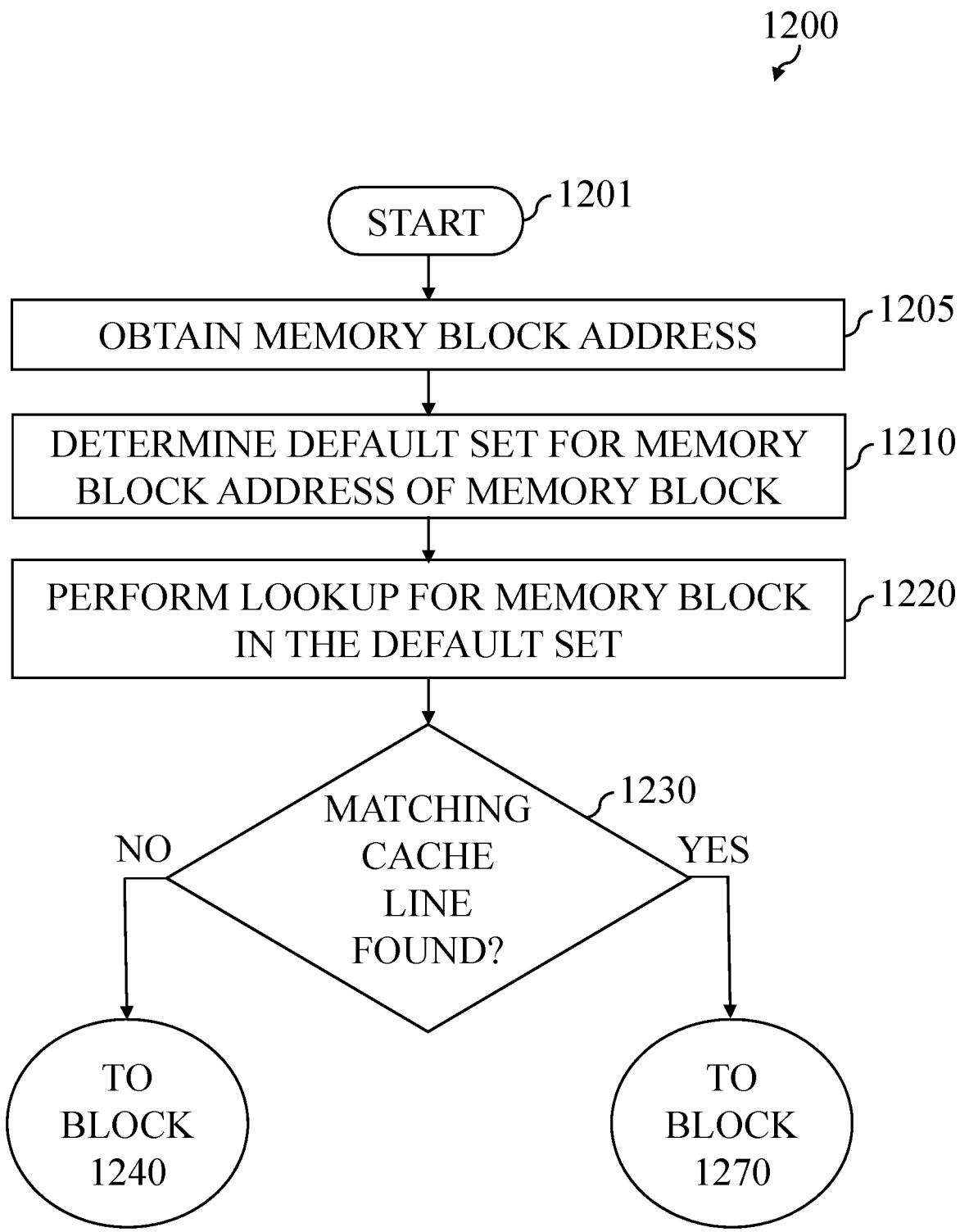
FIG. 12 depicts an example embodiment of method for reading a memory block from a cache line of a set associative cache supporting memory block redirection.

FIG. 12 depicts an example embodiment of method for reading a memory block from a cache line of a set associative cache supporting memory block redirection. It will be appreciated that, although primarily presented herein as being performed serially, at least a portion of the functions of method 1200 may be performed contemporaneously or in a different order than as presented in FIG. 12. At block 1201, the method 1200 begins. At block 1205, a memory block address of a memory block to be retrieved from the cache is obtained. The memory block address may be obtained as an input to the method 1200. At block 1210, the default set for the memory block is determined. The default set for the memory block may be determined based on the P-index of the address of the memory block. At block 1220, a primary lookup is performed for the memory block in the default set based on the primary tags of the cache lines of the default set. For example, a determination is made as to whether a primary tag "T" of a cache line in the default set matches the P-tag bits of the address of the memory block. At block 1230, a determination is made as to whether a matching cache line is found in the default set based on the primary lookup of the primary tags using the address of the memory block (i.e., if the memory block was identified as having been stored in one of the cache lines of its default set). If a matching cache line is not found in the default set based on the primary lookup, then the method 1200 proceeds to block 1240. If a matching cache line is found in the default set based on the primary lookup, then the method 1200 proceeds to block 1270. At block 1240, a secondary lookup is performed for the memory block in the default set based on the secondary tags of the cache lines of the default set. For example, a determination is made as to whether a secondary (redirection) tag "R" of a cache line in the default set matches the P-tag bits of the address of the memory block, which would indicate that the memory block was stored in the cache based on a redirection of the memory block from storage in its default set to storage in a second cache line of a second set. At block 1250, a determination is made as to whether a matching cache line is found in the default set based on the secondary lookup of the secondary tags using the address of the memory block (i.e., if the memory block was identified as having been redirected from one of the cache lines of its default set to a different set). If a matching cache line is found in the default set based on the secondary lookup, then the method 1200 proceeds to block 1260. If a matching cache line is not found in the default set based on the secondary lookup, then the method 1200 proceeds to block 1280. At block 1260, the memory block is retrieved from the second cache line of the second set to which the memory block was redirected as determined from the secondary tag matched in the default set for the memory block (e.g., the R-way in the R-set determined from the metadata of the matched cache line from the default set is retrieved). At block 1270, a "hit" is declared in the cache for the memory block (i.e., the memory block has been retrieved from the default set (at blocks 1220 and 1230) or has been retrieved from a second cache line in a second set where the memory block was stored within the cache using a redirection operation (at blocks 1240, 1250, and 1260), and then the method 1200 proceeds to block 1299 where the method 1200 ends. At block 1280, a "miss" is declared in the cache for the memory block (i.e., the memory block has not been retrieved from the default set and also not has been identified as having been redirected to a different set of the cache using a redirection), and then the method 1200 proceeds to block 1299 where the method 1200 ends. At block 1299, the method 1200 ends.

Figure 13:
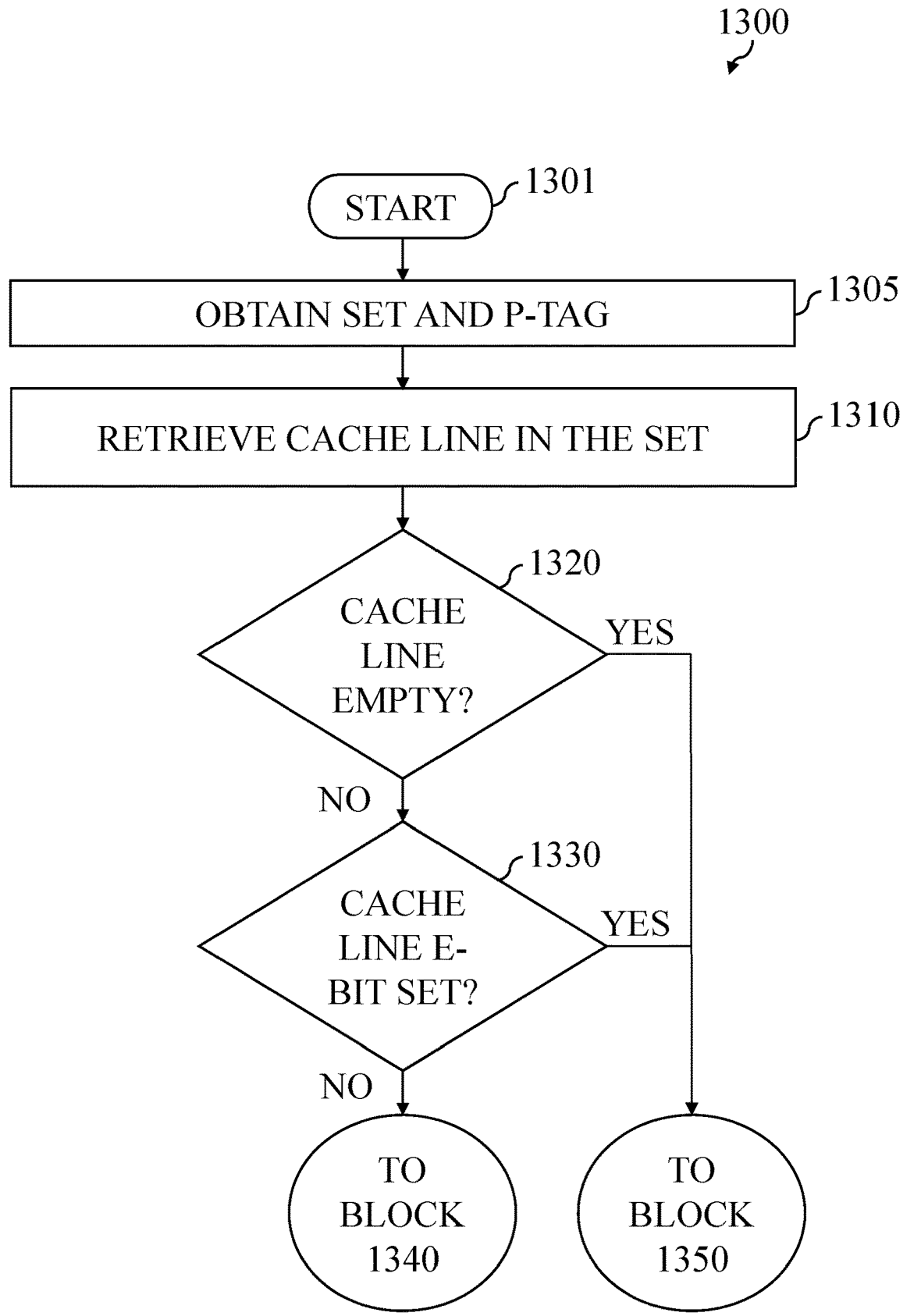
FIG. 13 depicts an example embodiment of a method for finding a matching cache line in a set of a set associative cache, for use in conjunction with the method of FIG. 12.

FIG. 13 depicts an example embodiment of a method for finding a matching cache line in a set of a set associative cache, for use in conjunction with the method of FIG. 12. It will be appreciated that the method 1300 of FIG. 13 may be used to implement the block 1220 of FIG. 12. It will be appreciated that, although primarily presented herein as being performed serially, at least a portion of the functions of method 1300 may be performed contemporaneously or in a different order than as presented in FIG. 13. At block 1301, the method 1300 begins. At block 1305, the set in the cache in which a lookup is to be performed and the P-tag bits from the address of the memory block are obtained. The set in the cache in which a lookup is to be performed and the P-tag bits from the address of the memory block may be obtained as an input to the method 1300. At block 1310, a cache line in the set is retrieved. In the first pass through, this is the first cache line in the set that is retrieved. In subsequent passes through, this is a next cache line in the set that has not been selected previously. At block 1320, a determination is made as to whether the retrieved cache line is empty. If the retrieved cache line is not empty, then the method 1300 proceeds to block 1330. If the retrieved cache line is empty, then the method 1300 proceeds to block 1350. At block 1330, a determination is made as to whether the cache line is marked as "external" (e.g., the E-bit in the metadata is set). If the cache line is not marked as external, then the method 1300 proceeds to block 1340. If the cache line is marked as external, then the method 1300 proceeds to block 1350. At block 1340, a determination is made as to whether the tag bits in the address of the memory block match the tag bits in the cache line (i.e., whether the cache line is storing the memory block being retrieved). If the tag bits in the address of the memory block do not match the tag bits in the cache line, then the method 1300 proceeds to block 1350. If the tag bits in the address of the memory block match the tag bits in the cache line, then the method 1300 proceeds to block 1360 (i.e., a "hit" is declared since the cache line storing the memory block has been identified). At block 1350, a determination is made as to whether there are more cache lines in the set that have not yet been checked (since a matching cache line has not yet been identified, any additional cache lines of the set that have not yet been checked should be checked). If there are no more cache lines in the set that have not yet been checked, the method 1300 proceeds to block 1370 (i.e., a "miss" is declared since every cache line in the set has been checked for direct storage of the memory block as well as redirection of the memory block, and the cache line storing the memory block has not been identified). If there are more cache lines in the set that have not yet been checked, the method 1300 returns to block 1310, at which point the next cache line is selected to be checked. At block 1360, a "hit" is declared in the cache for the memory block (i.e., the memory block has been identified as being stored in the default set (at block 1340)), and then the method 1300 proceeds to block 1399 where the method 1300 ends. At block 1370, a "miss" is declared in the cache for the memory block (i.e., every cache line in the set has been checked for direct storage of the memory block as well as redirection of the memory block, and the cache line storing the memory block has not been identified), and then the method 1300 proceeds to block 1399 where the method 1300 ends. At block 1399, the method 1300 ends.

Figure 14:
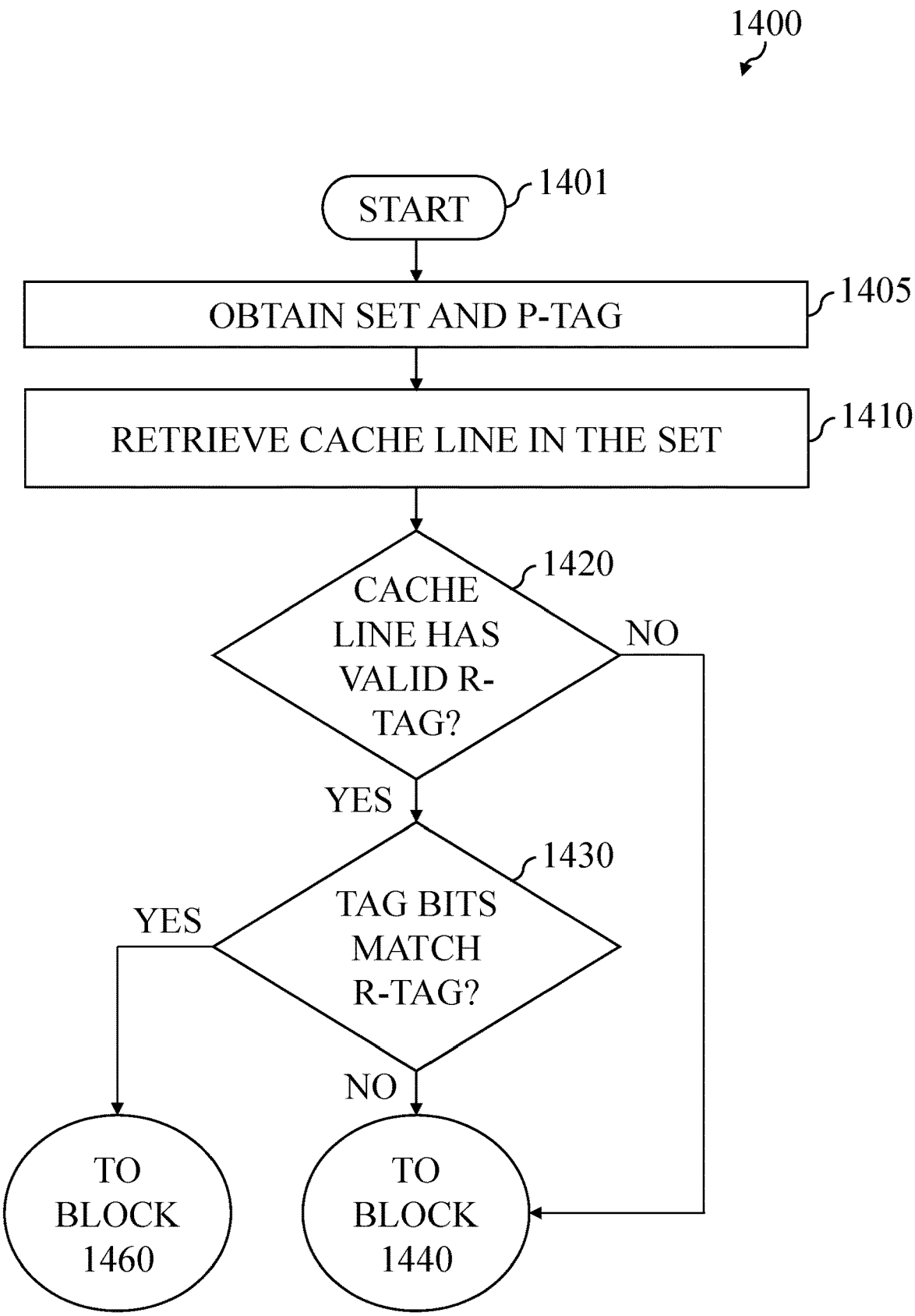
FIG. 14 depicts an example embodiment of a method for finding a matching cache line in a set of a set associative cache, for use in conjunction with the method of FIG. 12.

FIG. 14 depicts an example embodiment of a method for finding a matching cache line in a set of a set associative cache, for use in conjunction with the method of FIG. 12. It will be appreciated that the method 1400 of FIG. 14 may be used to implement the block 1240 of FIG. 12. It will be appreciated that, although primarily presented herein as being performed serially, at least a portion of the functions of method 1400 may be performed contemporaneously or in a different order than as presented in FIG. 14. At block 1401, the method 1400 begins. At block 1405, the set in the cache in which a lookup is to be performed (which is the default set for the memory block) and the P-tag bits from the address of the memory block are obtained. The set in the cache in which a lookup is to be performed and the P-tag bits from the address of the memory block may be obtained as an input to the method 1400. At block 1410, a cache line in the set is retrieved. In the first pass through, this is the first cache line in the set that is retrieved. In subsequent passes through, this is a next cache line in the set that has not been selected previously. At block 1420, a determination is made as to whether the retrieved cache line has a valid redirection ("R") tag (meaning that the cache line is indicating that the cache line was used as a basis for redirection of some memory block, which may or may not be the memory block being retrieved, to a different set). It is noted that the cache line can have a valid R-tag and yet be empty (if the cache line was evicted after R-tag was configured). If the retrieved cache line has a valid redirection ("R") tag, then the method 1400 proceeds to block 1430. If the retrieved cache line does not have a valid redirection ("R") tag, then the method 1400 proceeds to block 1440. At block 1430, a determination is made as to whether the tag bits in the address of the memory block match the "R" tag bits in the cache line (i.e., whether the cache line includes metadata indicating that the memory block was redirected from the selected cache line to a different cache line in a different set). If the tag bits in the address of the memory block do not match the "R" tag bits in the cache line, then the method 1400 proceeds to block 1440. If the tag bits in the address of the memory block match the "R" tag bits in the cache line, then the method 1400 proceeds to block 1460 (i.e., a "hit" is declared since the cache line which was the basis for redirection of the memory block has been identified, and the cache line to which the memory block was redirected can be identified from the metadata of that cache line). At block 1440, a determination is made as to whether there are more cache lines in the set that have not yet been checked (since a matching cache line has not yet been identified, any additional cache lines of the set that have not yet been checked should be checked). If there are no more cache lines in the set that have not yet been checked, the method 1400 proceeds to block 1450 (i.e., a "miss" is declared since every cache line in the set has been checked for redirection of the memory block, and the cache line storing the memory block has not been identified). If there are more cache lines in the set that have not yet been checked, the method 1400 returns to block 1410, at which point the next cache line is selected to be checked. At block 1450, a "miss" is declared in the cache for the memory block (i.e., every cache line in the set has been checked for redirection of the memory block, and the cache line storing the memory block has not been identified), and then the method 1400 proceeds to block 1499 where the method 1400 ends. At block 1460, a "hit" is declared in the cache for the memory block (i.e., the memory block has been identified as being redirected from the identified cache line to a different cache line in a different set), and then the method 1400 proceeds to block 1499 where the method 1400 ends. At block 1499, the method 1400 ends.

Figure 15:
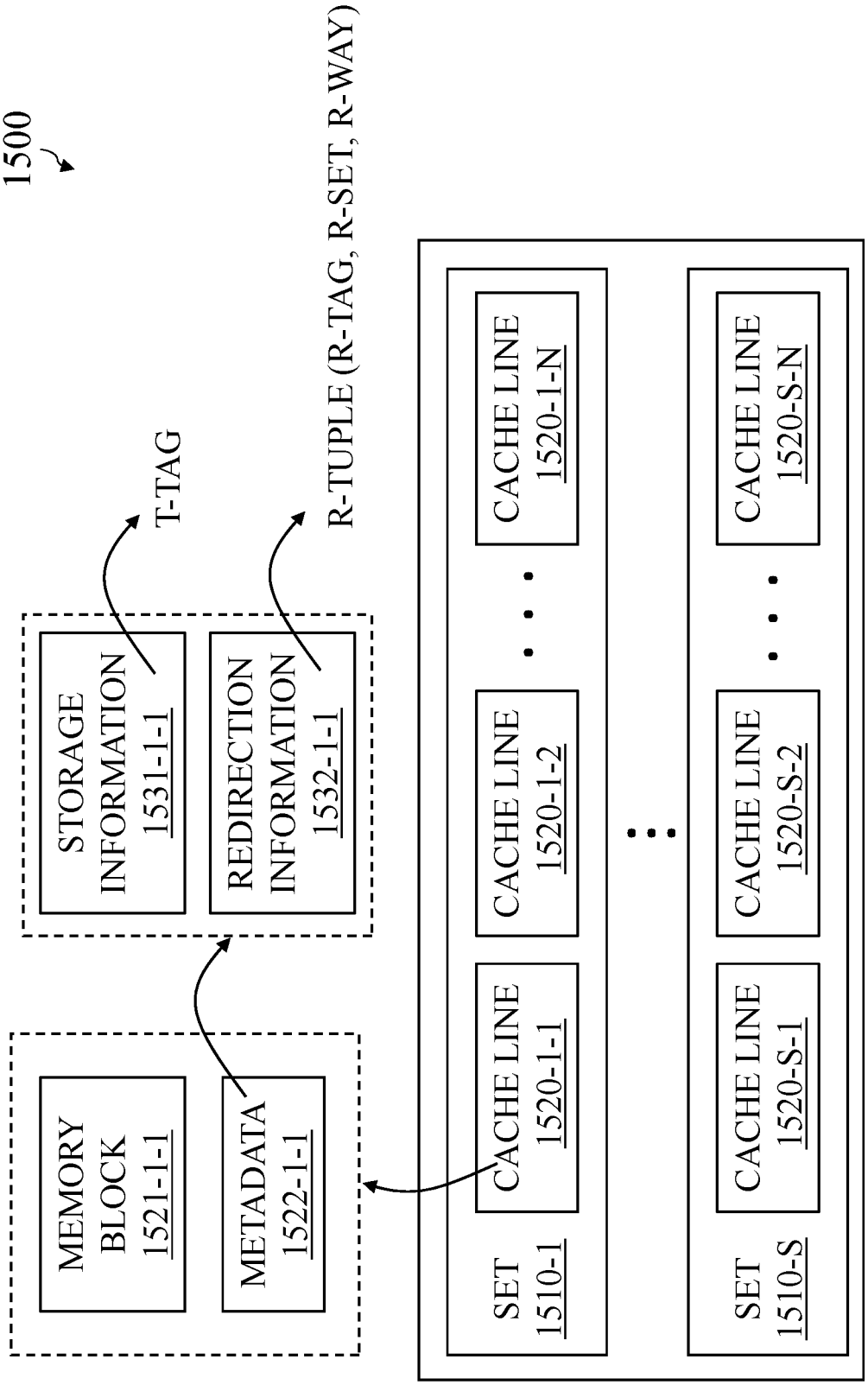
FIG. 15 depicts an example embodiment of a cache configured to support memory block redirection.

FIG. 15 depicts an example embodiment of a cache configured to support memory block redirection.

As illustrated in FIG. 15, a cache 1500 is configured to support memory block redirection. The cache 1500 is organized as a set associative cache including a plurality of sets 1510-1 to 1510-S (collectively, sets 1510). The cache 1500 is configured such that each of the sets 1510 includes N cache lines 1520 (illustratively, set 1510-1 includes N cache lines denoted as 1520-1-1 through 1520-1-N, set 1510-2 includes N cache lines denoted as 1520-2-1 through 1520-2-N, and so forth, with set 1510-S including N cache lines denoted as 1520-S-1 through 1520-S-N. For example, the cache 1510 may be implemented as an N-way set associative cache in which each of the N ways corresponds to each of the cache lines 1520 of each of the sets 1510, respectively.

The cache 1500 is configured such that each of the cache lines 1520 supports storage of a memory block 1521 and metadata 1522 (for purposes of clarity, only the memory block 1521-1-1 and metadata 1522-1-1 of cache line 1520-1-1 are depicted, but it will be appreciated that each of the other cache lines 1520 may store memory blocks 1521 and maintain metadata 1522). It is noted that the memory block 1521 may not be present when the cache line 1520 is empty and that the metadata 1522 may not be present when the cache line is not currently storing a memory block and not currently being used in a redirection operation.

The cache 1500 is configured such that the metadata 1522 of each cache line 1520 includes storage information 1531 and redirection information 1532 (for purposes of clarity, only the storage information 1531-1-1 and redirection information 1522-1-1 of the metadata 1522-1-1 of the cache line 1520-1-1 are depicted, but it will be appreciated that each of the other cache lines 1520 may maintain metadata 1522 including storage information 1531 and redirection information 1532).

The storage information 1531 of the metadata 1522 of a cache line 1520 includes an indication of the memory block 1521 that is currently stored in the cache line 1520. The memory block 1521 may be a memory block that is stored in the cache line 1520 because the set 1510 is the default set for the memory block 1521 or may be a memory block that is stored in the cache line 1520 based on a redirection of the memory block 1521. For example, this may be a P-tag field configured to store the P-tag bits of the memory block 1521. It will be appreciated that the storage information 1531 may include various other types and/or arrangements of information for supporting storage of memory blocks, either directly within their default sets or through redirection from default sets to other sets with available cache lines, within the cache 1500.

The redirection information 1532 of the metadata 1522 of a cache line 1520 includes information indicative of a redirection operation performed based on the cache line 1520, where the cache line 1520 may be the cache line from which the memory block was redirected (in which case the memory block that was redirected is not the memory block 1521 of the cache line 1520) or the cache line to which a memory block was redirected (e.g., in which case the memory block that was redirected is the memory block 1521 of the cache line 1520). For example, the redirection information 1532 may include a redirection tuple, where the information that is stored in the redirection tuple may vary depending on whether the cache line 1520 is the cache line from which the memory block was redirected (e.g., in which case the redirection tuple may include an T-tag field configured to store the P-tag bits of the memory block that was redirected, an R-set field configured to store information identifying the set 1510 to which the memory block was redirected, and an R-way field configured to store information identifying the cache line within the set 1510 to which the memory block was redirected) or the cache line to which a memory block was redirected (e.g., in which case the redirection tuple may include an R-set field configured to store information identifying the set 1510 from which the memory block was redirected and an R-way field configured to store information identifying the cache line within the set 1510 from which the memory block was redirected). For example, the redirection information 1532 also may include a field configured to indicate whether the memory block stored in the cache line was stored based on a direct storage operation (i.e., stored within its default set) or was stored based on a redirection operation (i.e., from its default set to a non-default set). It will be appreciated that the redirection information 1532 may include various other types and/or arrangements of information for supporting redirection of memory blocks from their default sets to other sets with available cache lines within the cache 1500.

The cache 1500, it will be appreciated, may be configured to support various other functions for supporting memory block redirection.

The cache 1500 may be configured to store a first memory block in a first cache line of a first set of the cache and a second memory block in a second cache line of a second set of the cache, maintain, for the first cache line, first metadata including an indication of the first memory block stored in the first cache line and an indication that the second memory block was redirected to the second cache line, and maintain, for the second cache line, second metadata including an indication of the second memory block stored in the second cache line and an indication that the second memory block was redirected to the second cache line from the first cache line. The first memory block and the second memory block may each map to the first set by default based on respective addresses of the first memory block and the second memory block.

The cache 1500 may be configured to store the first memory block in the first cache line of the first set based on a determination that the first memory block maps to the first set by default and a determination that the first cache line of the first set is empty and/or store the second memory block in the second cache line of the second set based on a determination that the second memory block maps to the first set by default, a determination that the first set is full, a determination that the first cache line of the first set has not yet been used for a memory block redirection operation, and a determination that the second cache line of the second set is empty.

The cache 1500 may be configured such that the first metadata includes a first tag including the indication of the first memory block stored in the first cache line of the first set and a second tag including the indication that the second memory block maps to the first set by default but is stored in the second cache line of the second set. The indication that the second memory block maps to the first set by default but is stored in the second cache line of the second set may include an identifier of the second memory block and an indication of an identity of the second cache line of the second set. The second tag may include a first field including the identifier of the second memory block, a second field including an identifier of the second set, and a third field including an identifier of the second cache line of the second set. The first metadata may include a third tag including an indication that the first memory block maps to the first set by default.

The cache 1500 may be configured such that the second metadata includes a first tag including the indication of the second memory block stored in the second cache line of the second set and a second tag including indication that the second memory block was redirected to the second cache line of the second set from the first cache line of the first set. The indication that the second memory block was redirected to the second cache line of the second set from the first cache line of the first set may include an indication of an identity of the first cache line of the first set. The second tag may include a first field including an identifier of the first set and a second field including an identifier of the first cache line. The second metadata may include a third tag including an indication that the second memory block was stored in the second cache line based redirection of the second memory block to the second set.

The cache 1500 may be configured to determine, prior to redirection of the second memory block to the second cache line of the second set from the first cache line of the first set, that the first metadata does not currently include an indication that the first cache line of the first set has already been used for a memory block redirection operation, and select, based on the determination that the first metadata does not currently include an indication that the first cache line of the first set has already been used for a memory block redirection operation, the first cache line of the first set as a basis for redirection of the secondary memory block to the second cache line from the first cache line.

The cache 1500 may be configured to detect a request to retrieve the first memory block from the cache, determine, based on an address of the first memory block, that the first memory block maps to the first set by default, determine, based on the first metadata, that the first memory block is stored in the first cache line of the first set, and read the first memory block from the first cache line of the first set. The first metadata may include a primary tag including an identifier of the first memory block, and the determination that the first memory block is stored in the first cache line of the first set may be based on matching of a portion of an address of the first memory block to the identifier of the first memory block.

The cache 1500 may be configured to detect a request to retrieve the second memory block from the cache, determine, based on an address of the second memory block, that the second memory block maps to the first set by default, determine, based on the first metadata, that the second memory block is stored in the second cache line of the second set, and read the second memory block from the second cache line of the second set. The first metadata may include a secondary tag including an identifier of the second memory block, an identifier of the second set, and an identifier of the second cache line of the second set, and the determination that the second memory block is stored in the second cache line of the second set may be based on matching of a portion of an address of the second memory block to the identifier of the second memory block.

It will be appreciated that the cache 1500 may be configured to support various other functions for supporting various example embodiments of memory block redirection.

Figure 16:
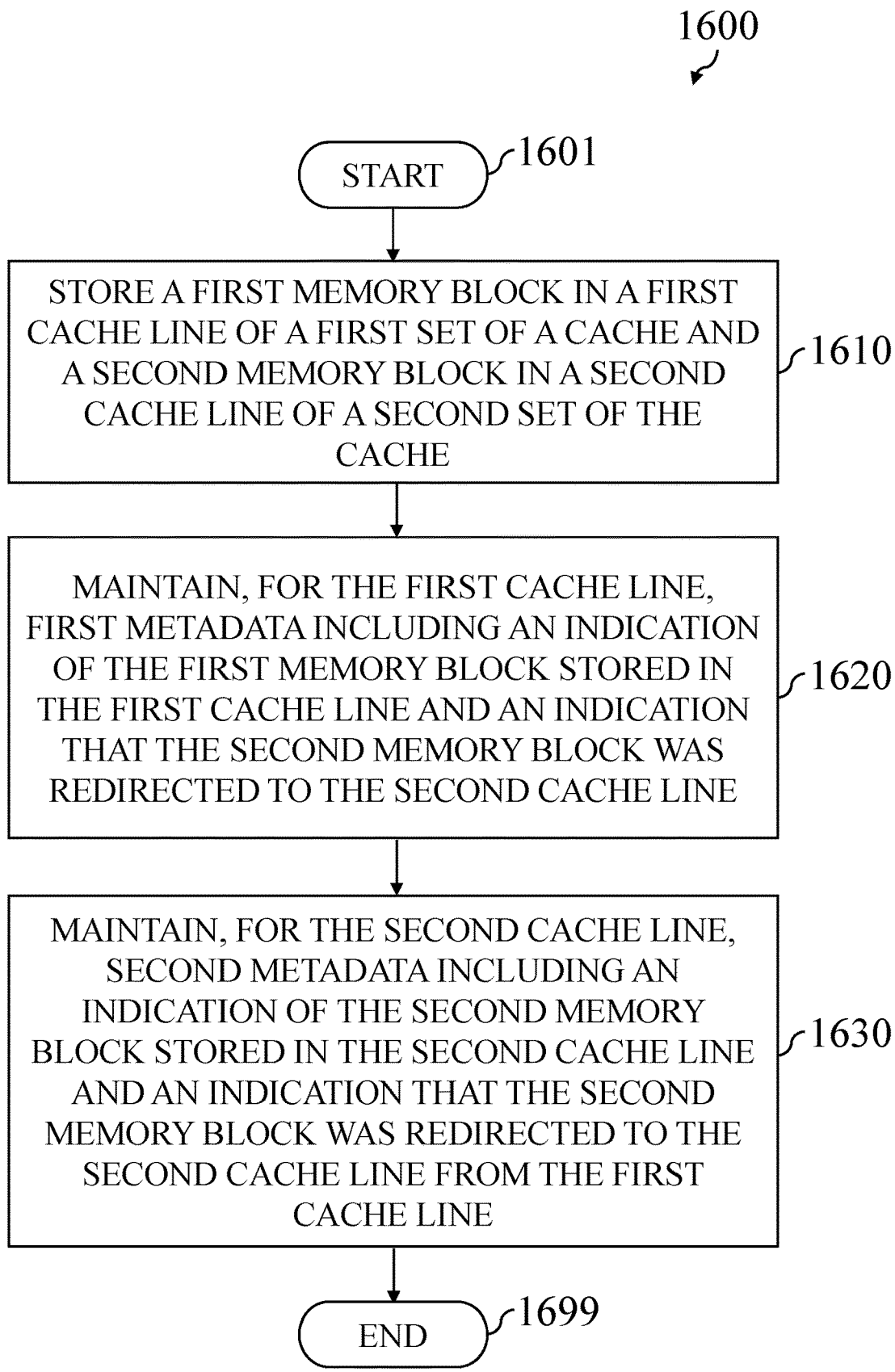
FIG. 16 depicts an example embodiment of a method for use a cache configured to support memory block redirection.

FIG. 16 depicts an example embodiment of a method for use a cache configured to support memory block redirection. It will be appreciated that, although primarily presented herein as being performed serially, at least a portion of the functions of method 1600 may be performed contemporaneously or in a different order than as presented in FIG. 16. At block 1601, the method 1600 begins. At block 1610, store a first memory block in a first cache line of a first set of a cache and a second memory block in a second cache line of a second set of the cache. At block 1620, maintain, for the first cache line, first metadata including an indication of the first memory block stored in the first cache line and an indication that the second memory block was redirected to the second cache line. At block 1630, maintain, for the second cache line, second metadata including an indication of the second memory block stored in the second cache line and an indication that the second memory block was redirected to the second cache line from the first cache line. At block 1699, the method 1600 ends.

Figure 17:
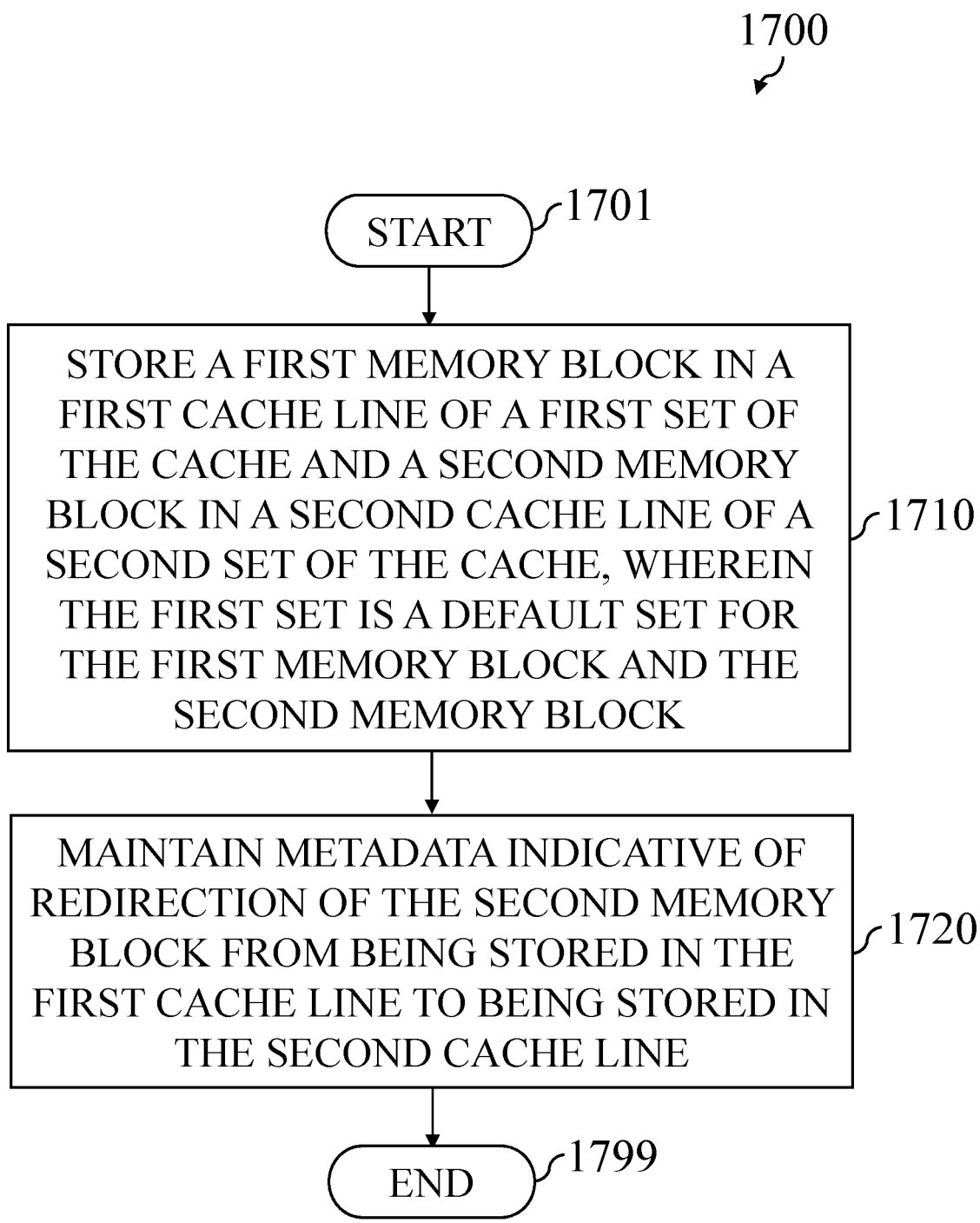
FIG. 17 depicts an example embodiment of a method for use a cache configured to support memory block redirection.

FIG. 17 depicts an example embodiment of a method for use a cache configured to support memory block redirection. It will be appreciated that, although primarily presented herein as being performed serially, at least a portion of the functions of method 1700 may be performed contemporaneously or in a different order than as presented in FIG. 17. At block 1701, the method 1700 begins. At block 1710, store a first memory block in a first cache line of a first set of the cache and a second memory block in a second cache line of a second set of the cache, wherein the first set is a default set for the first memory block and the second memory block. At block 1720, maintain metadata indicative of redirection of the second memory block from being stored in the first cache line to being stored in the second cache line. At block 1799, the method 1700 ends.

Figure 18:
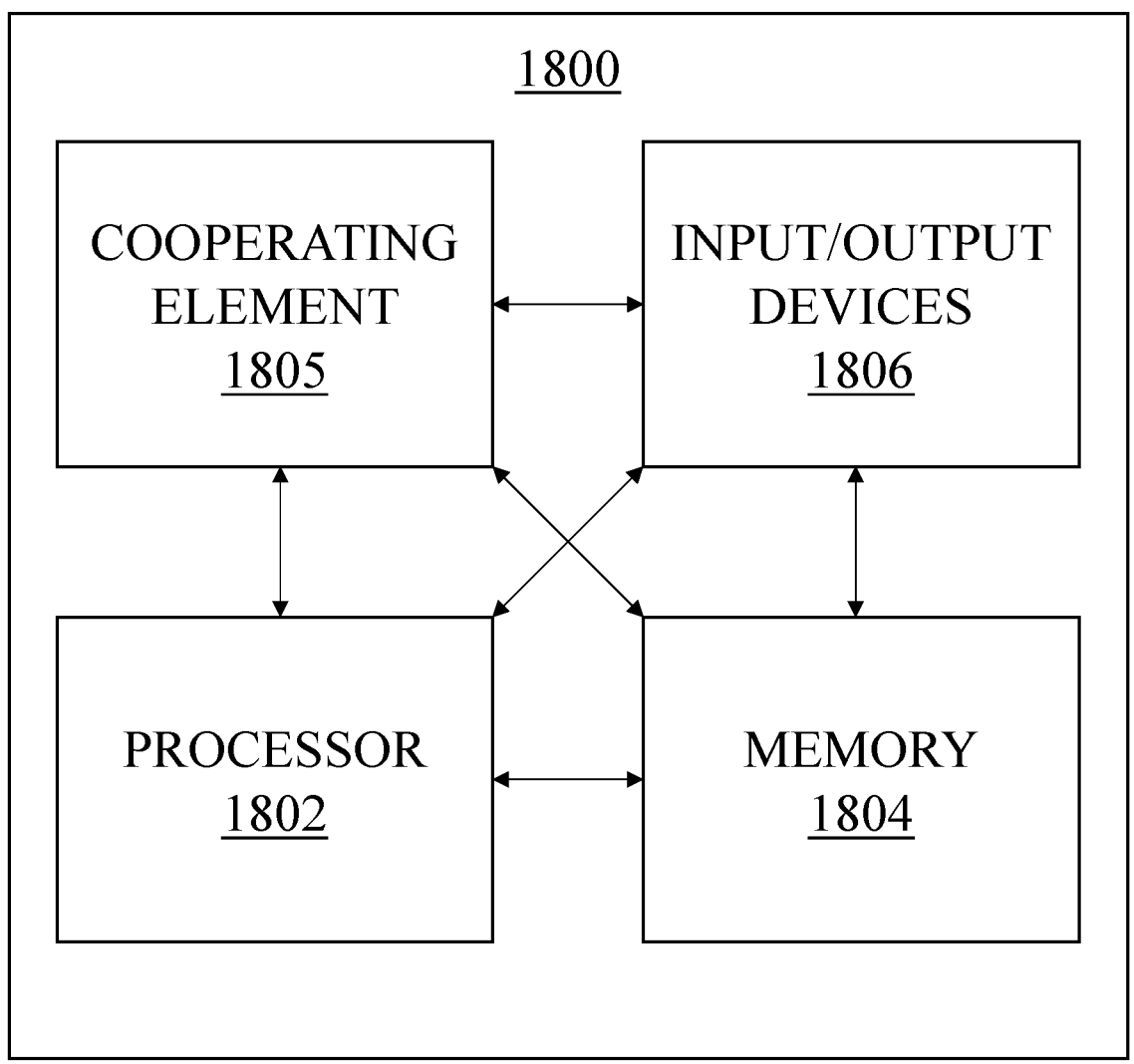
FIG. 18 depicts an example embodiment of a computer suitable for use in performing various functions presented herein.

FIG. 18 depicts an example embodiment of a computer suitable for use in performing various functions presented herein.

The computer 1800 includes a processor 1802 (e.g., a central processing unit (CPU), a processor, a processor core of a processor, a subset of processor cores of a processor, a set of processor cores of a processor, or the like) and a memory 1804 (e.g., a random access memory (RAM), a read-only memory (ROM), or the like). In at least some example embodiments, the computer 1800 may include at least one processor and at least one memory storing instructions that, when executed by the at least one processor, cause the computer to perform various functions presented herein.

The computer 1800 also may include a cooperating element 1805. The cooperating element 1805 may be a hardware device. The cooperating element 1805 may be a process that can be loaded into the memory 1804 and executed by the processor 1802 to implement various functions presented herein (in which case, for example, the cooperating element 1805 (including associated data structures) can be stored on a non-transitory computer readable medium, such as a storage device or other suitable type of storage element (e.g., a magnetic drive, an optical drive, or the like)).

The computer 1800 also may include one or more input/output devices 1806. The input/output devices 1806 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1800 may represent a general architecture and functionality suitable for implementing functional elements described herein, portions of functional elements described herein, or the like, as well as various combinations thereof. For example, computer 1800 may provide a general architecture and functionality that is suitable for implementing one or more elements presented herein, such as a processor or a portion thereof, a processor cache or a portion thereof, or the like.

It will be appreciated that computer 1800 also may represent a general architecture and functionality within which various example embodiments may be implemented (e.g., where the processor 1802 includes a cache configured to support various example embodiments presented herein).

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that, as used herein, the term "or" refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   a cache configured to:
   store a first memory block in a first cache line of a first set of the cache and a second memory block in a second cache line of a second set of the cache;
   maintain, for the first cache line, first metadata including an indication of the first memory block stored in the first cache line and an indication that the second memory block was redirected to the second cache line; and
   maintain, for the second cache line, second metadata including an indication of the second memory block stored in the second cache line and an indication that the second memory block was redirected to the second cache line from the first cache line.

2. The apparatus of claim 1, wherein the first memory block and the second memory block each map to the first set by default based on respective addresses of the first memory block and the second memory block.

3. The apparatus of claim 1, where the cache is configured to:
   store the first memory block in the first cache line of the first set based on a determination that the first memory block maps to the first set by default and a determination that the first cache line of the first set is empty.

4. The apparatus of claim 1, wherein the cache is configured to:
   store the second memory block in the second cache line of the second set based on a determination that the second memory block maps to the first set by default, a determination that the first set is full, a determination that the first cache line of the first set has not yet been used for a memory block redirection operation, and a determination that the second cache line of the second set is empty.

5. The apparatus of claim 1, wherein the first metadata includes:
   a first tag including the indication of the first memory block stored in the first cache line; and
   a second tag including the indication that the second memory block was redirected to the second cache line from the first cache line.

6. The apparatus of claim 5, wherein the indication that the second memory block was redirected to the second cache line from the first cache line includes an identifier of the second memory block and an indication of an identity of the second cache line of the second set.

7. The apparatus of claim 5, wherein the second tag includes:
   a first field including the identifier of the second memory block;
   a second field including an identifier of the second set; and
   a third field including an identifier of the second cache line of the second set.

8. The apparatus of claim 5, wherein the first metadata includes:
   a third tag including an indication that the first memory block maps to the first set by default.

9. The apparatus of claim 1, wherein the second metadata includes:
   a first tag including the indication of the second memory block stored in the second cache line of the second set; and
   a second tag including the indication that the second memory block was redirected to the second cache line from the first cache line.

10. The apparatus of claim 9, wherein the indication that the second memory block was redirected to the second cache line from the first cache line includes an indication of an identity of the first cache line of the first set.

11. The apparatus of claim 10, wherein the second tag includes:
   a first field including an identifier of the first set; and
   a second field including an identifier of the first cache line.

12. The apparatus of claim 9, wherein the second metadata includes:
   a third tag including an indication that the second memory block was stored in the second cache line based redirection of the second memory block.

13. The apparatus of claim 1, wherein the cache is configured to:
   determine, prior to redirection of the second memory block to the second cache line of the second set from the first cache line of the first set, that the first metadata does not currently include an indication that the first cache line of the first set has already been used for a memory block redirection operation; and
   select, based on the determination that the first metadata does not currently include an indication that the first cache line of the first set has already been used for a memory block redirection operation, the first cache line of the first set as a basis for redirection of the secondary memory block to the second cache line from the first cache line.

14. The apparatus of claim 1, wherein the cache is configured to:
   detect a request to retrieve the first memory block from the cache;
   determine, based on an address of the first memory block, that the first memory block maps to the first set by default;
   determine, based on the first metadata, that the first memory block is stored in the first cache line of the first set; and
   read the first memory block from the first cache line of the first set.

15. The apparatus of claim 14, wherein the first metadata includes a primary tag including an identifier of the first memory block, wherein the determination that the first memory block is stored in the first cache line of the first set is based on matching of a portion of an address of the first memory block to the identifier of the first memory block.

16. The apparatus of claim 1, wherein the cache is configured to:
   detect a request to retrieve the second memory block from the cache;
   determine, based on an address of the second memory block, that the second memory block maps to the first set by default;
   determine, based on the first metadata, that the second memory block is stored in the second cache line of the second set; and
   read the second memory block from the second cache line of the second set.

17. The apparatus of claim 16, wherein the first metadata includes a secondary tag including an identifier of the second memory block, an identifier of the second set, and an identifier of the second cache line of the second set, wherein the determination that the second memory block is stored in the second cache line of the second set is based on matching of a portion of an address of the second memory block to the identifier of the second memory block.

18. The apparatus of claim 1, wherein the cache is configured to be disposed within a processor.

19. The apparatus of claim 1, wherein the apparatus is a processor or a device including a processor.

20. A method, comprising:
   storing a first memory block in a first cache line of a first set of a cache and a second memory block in a second cache line of a second set of the cache;
   maintaining, for the first cache line, first metadata including an indication of the first memory block stored in the first cache line and an indication that the second memory block was redirected to the second cache line; and
   maintaining, for the second cache line, second metadata including an indication of the second memory block stored in the second cache line and an indication that the second memory block was redirected to the second cache line from the first cache line.

21. An apparatus, comprising:
   a cache configured to:
      store a first memory block in a first cache line of a first set of the cache and a second memory block in a second cache line of a second set of the cache, wherein the first set is a default set for the first memory block and the second memory block; and
      maintain metadata indicative of redirection of the second memory block from being stored in the first cache line to being stored in the second cache line.

* * * * *